United States Patent
Ren et al.

(10) Patent No.: US 12,494,525 B2
(45) Date of Patent: Dec. 9, 2025

(54) LITHIUM BATTERY SYSTEM AND OVERHEAD WORKING TRUCK

(71) Applicant: ZOOMLION INTELLIGENT ACCESS MACHINERY CO., LTD., Changsha (CN)

(72) Inventors: Huili Ren, Changsha (CN); Hou Zhu, Changsha (CN); Yi Zhong, Changsha (CN); Jianhui Duan, Changsha (CN); Lu Xiong, Changsha (CN)

(73) Assignee: ZOOMLION INTELLIGENT ACCESS MACHINERY CO., LTD., Changsha (CN)

( * ) Notice: Subject to any disclaimer, the term of this patent is extended or adjusted under 35 U.S.C. 154(b) by 834 days.

(21) Appl. No.: 17/790,007

(22) PCT Filed: Mar. 30, 2021

(86) PCT No.: PCT/CN2021/084024
§ 371 (c)(1),
(2) Date: Jun. 29, 2022

(87) PCT Pub. No.: WO2022/062352
PCT Pub. Date: Mar. 31, 2022

(65) Prior Publication Data
US 2023/0040511 A1 Feb. 9, 2023

(30) Foreign Application Priority Data
Sep. 27, 2020 (CN) .......................... 202011033069.6
Sep. 27, 2020 (CN) .......................... 202011034939.1

(51) Int. Cl.
*H01M 10/615* (2014.01)
*H01M 10/0525* (2010.01)
(Continued)

(52) U.S. Cl.
CPC ..... *H01M 10/615* (2015.04); *H01M 10/0525* (2013.01); *H01M 10/425* (2013.01);
(Continued)

(58) Field of Classification Search
CPC .......... H01M 10/615; H01M 10/0525; H01M 10/425; H01M 10/441; H01M 10/443;
(Continued)

(56) References Cited

U.S. PATENT DOCUMENTS

2019/0077267 A1* 3/2019 Song .................... G01R 19/165

FOREIGN PATENT DOCUMENTS

| CN | 103887578 A | 6/2014 |
|----|-------------|--------|
| CN | 105818708 A | 8/2016 |

(Continued)

*Primary Examiner* — Julian D Huffman
*Assistant Examiner* — Aiman Bickiya
(74) *Attorney, Agent, or Firm* — Volpe Koenig

(57) ABSTRACT

A lithium battery system comprising a battery and a feedback current control apparatus having a first current capture device that comprises: a first feedback current capture module for capturing feedback current; a first switch module for conducting or unidirectionally cutting off a main circuit; and a control module for receiving a first voltage of one end of a driver on the main circuit, a second voltage of one end of the battery, and the temperature of the battery. When a difference between the first and second voltage is greater than a preset voltage and the temperature of the battery is less than or equal to a preset temperature, the first switch module is controlled to unidirectionally cut off the main circuit to capture feedback current by the first feedback current capture module on a first current capture circuit, greatly reducing the probability of lithium precipitation and risk of thermal runaway.

20 Claims, 6 Drawing Sheets

(51) Int. Cl.
- *H01M 10/42* (2006.01)
- *H01M 10/44* (2006.01)
- *H01M 10/48* (2006.01)
- *H01M 10/625* (2014.01)
- *H01M 10/63* (2014.01)
- *H01M 10/657* (2014.01)
- *H02J 7/00* (2006.01)

(52) U.S. Cl.
CPC ....... *H01M 10/441* (2013.01); *H01M 10/443* (2013.01); *H01M 10/482* (2013.01); *H01M 10/486* (2013.01); *H01M 10/625* (2015.04); *H01M 10/63* (2015.04); *H01M 10/657* (2015.04); *H02J 7/007182* (2020.01); *H02J 7/007194* (2020.01); *H01M 2010/4271* (2013.01); *H01M 2220/20* (2013.01)

(58) Field of Classification Search
CPC ............. H01M 10/482; H01M 10/486; H01M 10/625; H01M 10/63; H01M 10/657; H01M 2010/4271; H01M 2220/20; H01M 10/48; H01M 10/052; H01M 10/42; H01M 10/44; H02J 7/007182; H02J 7/007194; H02J 7/0031; H02J 7/0047; H02J 7/00714; B60L 2240/545; B60L 2240/549; B60L 7/10; B60L 58/27; Y02E 60/10
USPC .......................................................... 320/136
See application file for complete search history.

(56) References Cited

FOREIGN PATENT DOCUMENTS

| | | | | |
|---|---|---|---|---|
| CN | 107512179 A | * | 12/2017 | ................ B60L 7/10 |
| CN | 108973780 A | * | 12/2018 | ............. B60L 15/20 |
| CN | 109572482 A | | 4/2019 | |
| CN | 110549912 A | | 12/2019 | |
| CN | 111169324 A | | 5/2020 | |
| CN | 111525656 A | * | 8/2020 | .......... H02J 7/00302 |
| CN | 111559278 A | | 8/2020 | |
| CN | 112259829 A | | 1/2021 | |
| CN | 112260342 A | | 1/2021 | |
| EP | 2410591 A1 | | 1/2012 | |

* cited by examiner

LITHIUM BATTERY SYSTEM AND OVERHEAD WORKING TRUCK

CROSS REFERENCE TO RELATED APPLICATIONS

This application is a 35 USC § 371 National Stage application of International Patent Application No. PCT/CN2021/084024, which was filed Mar. 30, 2021, entitled "LITHIUM BATTERY SYSTEM AND OVERHEAD WORKING TRUCK" and claims priority to Chinese Patent Application No. 202011034939.1, filed Sep. 27, 2020 and Chinese Patent Application No. 202011033069.6, filed Sep. 27, 2020 which are incorporated herein by reference as if fully set forth.

FIELD OF THE INVENTION

The present invention relates to the technical field of engineering machinery, and in particular to a lithium-ion battery system and an aerial equipment.

BACKGROUND OF THE INVENTION

Since an electrically driven aerial equipment (self-propelled) is usually not equipped with a mechanical friction brake, this aerial equipment slows down or stops depending on an energy feedback type regenerative braking technique. However, the regenerative braking technique has the following two characteristics: 1. a walking motor driver serves as both an inverter and a rectifier, when the aerial equipment slows down or goes downhill, kinetic energy is converted into electric energy, and the electric energy is then fed back to a power battery; 2. since the slowdown time and braking time of the aerial equipment are generally short and a maximum speed is generally 6 KM/H or so, the braking usually generates a high instantaneous pulse feedback current. Therefore, in operating conditions (for example, spraying/brushing or transitions in a construction site) that the aerial equipment needs to stop and go alternately, the pulse feedback current will be generated at a higher frequency.

For an electrically driven aerial equipment using a lithium-ion power battery, a large number of experimental results show that when the temperature of the power battery is lower than 0° C., the pulse feedback current leads to large-area lithium precipitation in a negative plate of the battery. Lithium precipitation may reduce the capacity of the power battery, and in severe cases, lithium dendrites may be produced to pierce a membrane, which further causes a short circuit inside the battery. If the battery is short-circuited in a large area, there is a risk of thermal runaway. Therefore, it is necessary to take strong measures to avoid the risk caused by pulse charging at low temperature.

In order to avoid the risk caused by pulse charging at low temperature, a heating device is usually configured inside the battery. When the battery is charged at low temperature, a BMS (Battery Management System) uses a charger to supply electricity to the heating device, and the heating device heats the battery to an appropriate temperature. Thus, when slowing down or going downhill, the electrically driven aerial equipment performs braking by utilizing the regenerative braking technique, and the generated feedback current can directly flow into the battery at the appropriate temperature. However, limited by many factors, the power of the heating device is not high, and the temperature rise rate is usually around 10° C./h. When the temperature is low, it will take a long time to heat the battery, which affects the customer's use of the equipment. In addition, since the aerial equipment usually works intermittently with long shutdown intervals, the temperature of the battery is difficult to maintain (it cannot be guaranteed that the temperature of the battery is kept to be 0° C. or above all the time when the battery is discharged), so this technique does not achieve a good effect, and provides a poor user experience. Therefore, the prior art brings in an extremely limited effect on reducing the risk caused by pulse charging at low temperature.

SUMMARY OF THE INVENTION

An objective of the present invention is to provide a lithium-ion battery system and an aerial equipment configured with the lithium-ion battery system, which can effectively avoid the risk of lithium precipitation of a battery caused by a pulse feedback current when charging is performed at low temperature, thereby greatly reducing the probability of lithium precipitation of the battery and the risk of thermal runaway of the battery and enhancing the safety of the battery.

In order to achieve the above objective, in a first aspect of the present invention, a lithium-ion battery system is provided, including: a battery, wherein a power circuit between the battery and a driver includes: a main circuit between the battery and the driver, and a first current capture circuit configured to divide a feedback current delivered by the driver; and a feedback current control device. Wherein the feedback current control device includes: a first current capture device, located on the first current capture circuit and including: a first feedback current capture module configured to capture the feedback current, and a first switch module located on the main circuit, and configured to turn on the main circuit, or unidirectionally cut off the main circuit to only allow the battery to supply electricity to the driver; and a control module including: a receiving unit configured to receive a first voltage at one end of the driver and a second voltage at one end of the battery on the main circuit and a temperature of the battery, and a first control unit configured to, according to a difference between the first voltage and the second voltage and the temperature of the battery, perform the following operations: controlling the first switch module to unidirectionally cut off the main circuit under the condition that the difference between the first voltage and the second voltage is greater than a preset voltage and the temperature of the battery is less than or equal to a preset temperature such that the first feedback current capture module on the first current capture circuit captures the feedback current.

Optionally, wherein the first switch module is a combination of a diode and a contactor connected in parallel, and the first control unit configured to control the first switch module to unidirectionally cut off the main circuit comprises: controlling the contactor to be off so as to unidirectionally cut off the main circuit by the diode.

Optionally, wherein the first switch module is a first field-effect transistor with a chip, and the first control unit configured to control the first switch module to unidirectionally cut off the main circuit comprises: controlling the chip of the first field-effect transistor to unidirectionally cut off the main circuit.

Optionally, wherein the first current capture device further comprises: a second switch module, configured to turn on or off the first current capture circuit, and the control module further comprises: a second control unit, configured to, under the condition that the difference between the first voltage and the second voltage is greater than the preset voltage and the temperature of the battery is greater than the preset temperature, perform the following operations: controlling the second switch module to turn on the first current capture circuit; and controlling the first switch module to turn on the main circuit such that the driver charges the battery.

Optionally, wherein the second control unit is further configured to regulate on-off time of the second switch module according to the difference between the first voltage and the second voltage to ensure that the driver charges the battery.

Optionally, wherein the second control unit is further configured to, under the condition that the difference between the first voltage and the second voltage is less than or equal to the preset voltage, perform the following operations: controlling the second switch module to cut off the first current capture circuit; and controlling the first switch module to unidirectionally cut off the main circuit to only allow the battery to supply electricity to the driver.

Optionally, wherein the feedback current control device further comprises: a second current capture device, located on a second current capture circuit connected in parallel with the first current capture circuit, wherein the second current capture device comprises: a second feedback current capture module, configured to capture the feedback current; and a third switch module, configured to turn on or off the second current capture circuit, the second control unit is further configured to, under the condition that the difference between the first voltage and the second voltage is greater than the preset voltage and the temperature of the battery is less than or equal to the preset temperature, control the second switch module and the third switch module to turn on the first current capture circuit and the second current capture circuit such that the first feedback current capture module and the second feedback current capture module jointly capture the feedback current.

Optionally, wherein the first feedback current capture module or the second feedback current capture module is one of an energy consumption module, an energy storage module and a heating module.

Optionally, wherein the feedback current control device further comprises: a bypass switch, wherein the bypass switch is connected in parallel with the first switch module, and the control module further comprises: a third control unit, configured to control the bypass switch to be closed such that the battery supplies electricity to the driver under the condition that the first switch module fails.

According to the above technical solution, in an inventive way, the first switch module is used to unidirectionally cut off the main circuit (that is, only turn off a unidirectional circuit for the driver to charge the battery) under the condition that the difference between the first voltage at one end of the driver and the second voltage at one end of the battery on the main circuit is greater than the preset voltage and the temperature of the battery is less than the preset temperature (for example, 0° C.). Thereby, when charging is performed at low temperature, the feedback current capture module can capture all the feedback currents, so that the risk of lithium precipitation of the battery caused by a pulse feedback current when charging is performed at low temperature can be effectively avoided, and further, the probability of lithium precipitation of the battery and the risk of thermal runaway of the battery is greatly reduced, and the safety of the battery is enhanced.

In a second aspect of the present invention, a lithium-ion battery system is provided, including: a battery, the battery includes a plurality of modules, and a power circuit between the battery and a driver includes: a main circuit between the battery and the driver, and current capture circuits configured to divide a feedback current delivered by the driver, and including a plurality of current capture branches connected in parallel with each other; and a feedback current control device. The feedback current control device includes: a plurality of current capture module groups that are located on the plurality of current capture branches and are in one-to-one correspondence with the plurality of current capture branches; and a control module. Wherein each of the plurality of current capture module groups includes: a heating module, arranged in cooperation with a position of a corresponding module of the battery, and configured to capture the feedback current and convert the feedback current into thermal energy so as to heat the module corresponding to the heating module; and a first switch module that is configured to turn on or off a current capture branch where the first switch module is located. Wherein the control module including: a first receiving unit that is configured to receive a first voltage at one end of the driver and a second voltage at one end of the battery on the main circuit and an average temperature of the battery, and a first control unit that is configured to, according to a difference between the first voltage and the second voltage and the average temperature of the battery, perform the following operations: controlling the first switch module in each of the current capture module groups to turn on the current capture branch where the first switch module is located under the condition that the difference between the first voltage and the second voltage is greater than a preset voltage and the average temperature of the battery is less than or equal to a preset temperature such that the feedback current is converted into thermal energy by the heating module in each of the current capture module groups and the module corresponding to the heating module is heated by the converted thermal energy.

Optionally, wherein a power of the heating module is greater than a preset power.

Optionally, wherein the heating module is a heating film or a heat exchanger.

Optionally, wherein the heating module is arranged at a periphery of the module of the battery corresponding to the heating module.

Optionally, wherein the heating module is further configured to capture a charging current provided by the driver and convert the charging current into thermal energy so as to heat the module corresponding to the heating module, and the control module further comprises: a second receiving unit, configured to receive an electric quantity of the battery, and a second control unit, configured to control the first switch module in each of the current capture module groups to turn on a corresponding current capture branch by a time-sharing control strategy under the condition that the battery is in a charging awake state and a difference between the preset temperature and the average temperature of the battery is greater than a preset temperature difference, such that the charging current provided by the driver is converted into thermal energy by the heating module on the corresponding current capture branch and the module corresponding to the heating module is heated by the converted thermal energy.

Optionally, wherein the time-sharing control strategy is to determine, according to the power of the heating module in each of the current capture module groups, a preset cycle during which the first switch module in each of the current capture module groups is controlled to turn on the corresponding current capture branch.

Optionally, wherein each of the current capture module groups further comprises: a temperature sensor, configured to acquire a temperature of the module corresponding to the heating module, and the second control unit is further configured to, under the condition that the electric quantity of the battery is less than a preset electric quantity and the difference between the preset temperature and the average temperature of the battery is greater than 0 and less than or equal to the preset temperature difference, control on-off time of respective first switch modules in the plurality of current capture module groups according to the temperatures of the modules of the battery, such that the battery is uniformly heated by the heating modules in the plurality of current capture module groups.

Optionally, wherein the feedback current control device further comprises: a second switch module, located on the main circuit, and configured to turn on the main circuit, or unidirectionally cut off the main circuit to only allow the battery to supply electricity to the driver, and the first control unit is further configured to, under the condition that the difference between the first voltage and the second voltage is greater than the preset voltage and the average temperature of the battery is greater than the preset temperature, perform the following operations: controlling the second switch module to turn on the main circuit; and controlling the first switch module in each of the current capture module groups to turn on a corresponding current capture branch, and regulate the on-off time of the first switch module in each of the current capture module groups according to the difference between the first voltage and the second voltage to ensure that the driver charges the battery with the feedback current.

Optionally, wherein the second switch module is a combination of a diode and a contactor connected in parallel, and the first control unit is further configured to control the contactor to be closed so as to turn on the main circuit, or control the contactor to be closed so as to unidirectionally cut off the main circuit by the diode; or wherein the second switch module is a first field-effect transistor with a chip, and the first control unit is further configured to control the chip of the first field-effect transistor to turn on the main circuit or unidirectionally cut off the main circuit.

Optionally, each of the plurality of modules comprises at least one cell, wherein a gap between the at least one cell is greater than a preset gap.

According to the above technical solution, in an inventive way, the first switch modules in the respective current capture module groups are used to turn on the respective current capture circuits under the condition that the difference between the first voltage at one end of the driver and the second voltage at one end of the battery on the main circuit is greater than the preset voltage and the average temperature of the battery is less than the preset temperature (for example, 0° C.), the heating modules can convert the feedback current into the thermal energy, and the battery can be heated by the thermal energy. Thereby, when charging is performed at low temperature, the heating modules can capture all the feedback currents, and the battery can be heated by the thermal energy generated by the feedback current, so that the requirements of equipment for braking can be met, also, the risk of lithium precipitation of the battery caused by the pulse feedback current when charging is performed at low temperature can be effectively avoided, thereby greatly reducing the probability of lithium precipitation of the battery and the risk of thermal runaway of the battery and enhancing the safety of the battery.

A third aspect of the present invention provides an aerial equipment. The aerial equipment includes: the above lithium-ion battery system.

Other features and advantages of the present invention will be described in detail in the Detailed Description below.

BRIEF DESCRIPTION OF DRAWINGS

The accompanying drawings are intended to provide a further understanding of the present invention, constitute a part of the specification, are used to explain the present invention together with the specific embodiments below, but are not intended to limit the present invention.

In the accompanying drawings.

| Description of reference signs | |
| --- | --- |
| 1 | Cell |
| 2, 3 | Heating module |
| 4, 7 | Current capture module group |
| 5, 6, 50 | First switch module |
| 8, 44 | Second switch module |
| 10, 800 | Feedback current control device |
| 20 | Driver |
| 30 | Battery |
| 40 | First current capture device |
| 42 | First feedback current capture module |
| 46 | Temperature sensor |
| 52 | Diode |
| 54, 90, 442, 742 | Contactor |
| 60 | Battery box |
| 70 | Second current capture device |
| 72 | Second feedback current capture module |
| 74 | Third switch module |
| 80 | Electric motor |
| 100 | Pre-charge resistor |
| 110 | Pre-charge relay |
| 120 | Current divider |
| 420, 421 | Heating film |
| 440, 500, 740 | MOS transistor |

DETAILED DESCRIPTION OF THE EMBODIMENTS

Specific embodiments of the present invention will be described in detail below in conjunction with the accompanying drawings. It should be understood that the specific embodiments described here are merely used to illustrate and explain the present invention and are not intended to limit the present invention.

Before the specific embodiments of the present invention are described, two concepts are briefly explained first.

Regenerative braking: when an electric lift brakes, an (walking) electric motor can be controlled to operate as a generator, so that kinetic energy or potential energy of the equipment can be converted into electric energy, which is stored in an energy storage module.

Feedback current: during the regenerative braking process, a driver converts electric energy generated by the (walking) electric motor into a current that can be used by the energy storage module or other energy consuming components. This current is called the feedback current.

Considering that an aerial equipment is not equipped with a mechanical friction brake and its working conditions, the electric motor generates pulse feedback current at a higher frequency, and this pulse feedback current is much greater than the pulse feedback current of a passenger vehicle. The prior art is far from being able to reduce pulse charging current to meet the requirements for the use of the aerial equipment. Therefore, in the embodiments of the present invention, a strategy of restraining the pulse feedback current from charging a battery (of the aerial equipment), the risk caused by high pulse charging to the aerial equipment is solved by the way of no heating.

Figure 1:
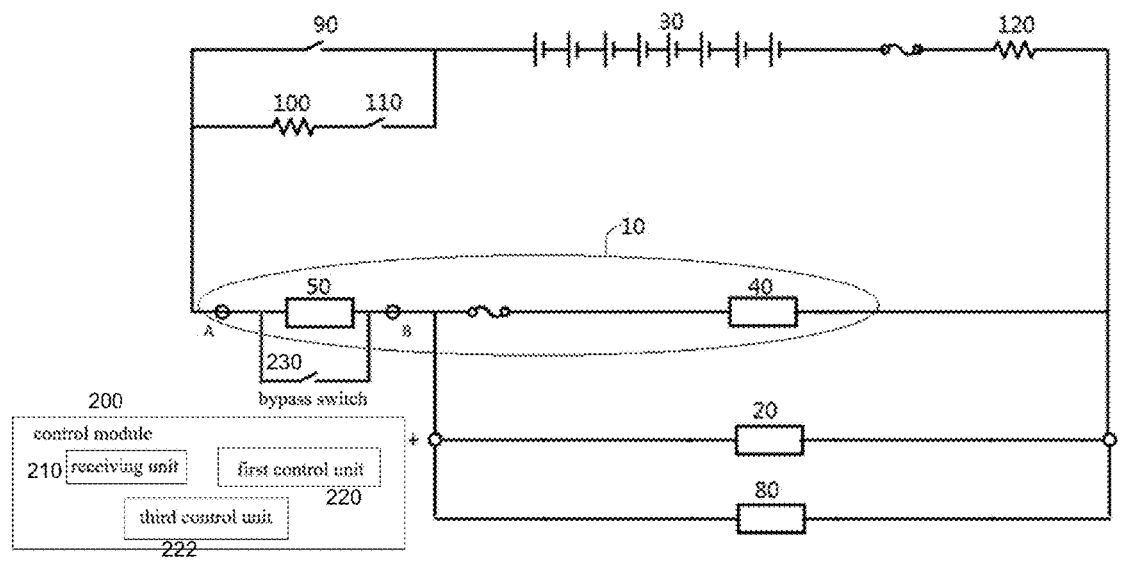
FIG. 1 is a schematic structural diagram of a lithium-ion battery system according to an embodiment of the present invention.
Figure 2:
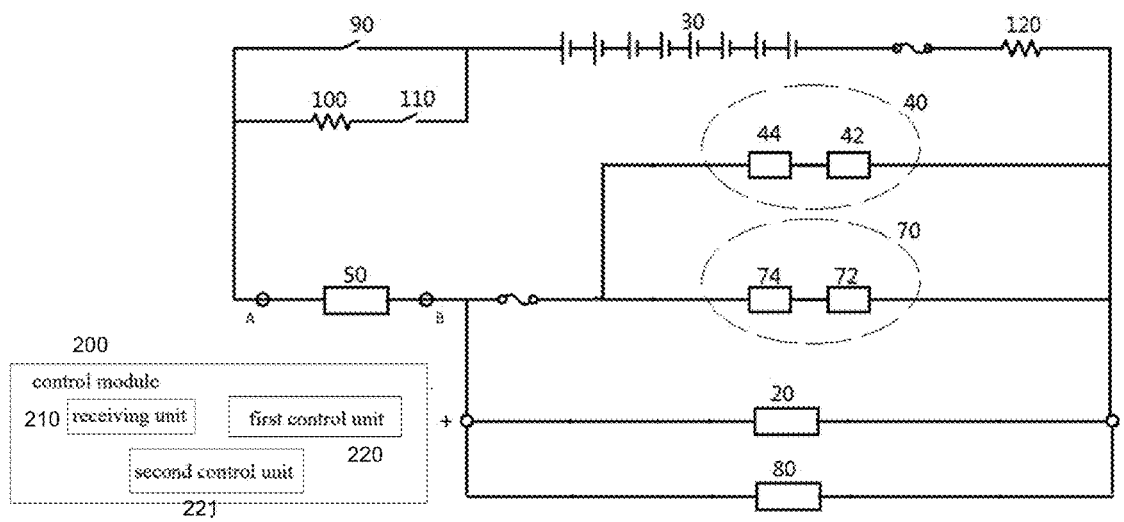
FIG. 2 is a schematic structural diagram of a lithium-ion battery system according to an embodiment of the present invention.

FIG. 1 is a structural diagram of a lithium-ion battery system according to an embodiment of the present invention. As shown in FIG. 1, the lithium-ion battery system may include: a battery (i.e., lithium-ion battery) 30 and a feedback current control device 10. A power circuit between the battery 30 and a driver 20 includes: a main circuit between the battery 30 and the driver 20; and a first current capture circuit configured to divide a feedback current delivered by the driver 20. The feedback current control device 10 may include: a first current capture device 40 and a control module 200. The first current capture device 40 is located on the first current capture circuit. The first current capture device 40 includes: a first feedback current capture module 42 (as shown in FIG. 2), configured to capture the feedback current; and a first switch module 50 that is located on the main circuit, and configured to turn on the main circuit, or unidirectionally cut off the main circuit to only allow the battery 30 to supply electricity to the driver 20. The control module 200 includes: a receiving unit 210, configured to receive a first voltage at one end of the driver 20 and a second voltage at one end of the battery 30 on the main circuit and a temperature of the battery 30; and a first control unit 220, configured to, according to a difference between the first voltage and the second voltage and the temperature of the battery 30, perform the following operations: controlling the first switch module to unidirectionally cut off the main circuit under the condition that the difference between the first voltage and the second voltage is greater than a preset voltage and the temperature of the battery 30 is less than or equal to a preset temperature such that the feedback current is captured by the first feedback current capture module 42 on the first current capture circuit.

Wherein a first end of the main circuit is connected to a positive electrode of the driver 20, and the other end of the main circuit is connected to a positive electrode of the battery 30. One end of the first current capture circuit is connected to a point B on the main circuit (any point on the main circuit between a current output terminal of the first switch module 50 and the driver 20) (i.e., the positive electrode of the driver), and the other end of the first current capture circuit is connected to a negative electrode of the driver, which is used for restraining pulse feedback current from charging the battery when the battery is at low temperature to prevent the battery from lithium precipitation, thereby prolonging the battery life of equipment.

Specifically, when a difference between a first voltage $U_B$ at one end of the driver 20 and a second voltage $U_A$ at one end of the battery 30 on the main circuit is greater than the preset voltage (indicating that an electric motor generates electromotive force, for example, the preset voltage is 0 V) and the temperature of the battery is lower than the preset temperature (for example, 0° C.), the feedback energy (feedback current) generated is completely converted into thermal energy by the first current capture device 40 to be consumed, and is not delivered to the battery 30 (cannot charge the battery 30). Hence, in the embodiment, when the battery 30 is at low temperature (for example, the temperature of the battery is less than 0° C.), the battery 30 does not need to be heated, which thereby does not affect the user's operation experience, and is beneficial to prolong the battery life of an aerial equipment. Since the battery does not need to be heated, a user can operate the equipment without waiting for the battery to be preheated, which improves the operation experience on the equipment. In addition, when the equipment works, the temperature of the battery can be maintained to be 0° C. or above without consuming the energy of the battery, so that the consumption of electric energy is reduced, which is conducive to saving energy and prolonging the battery life of the equipment.

Figure 3:
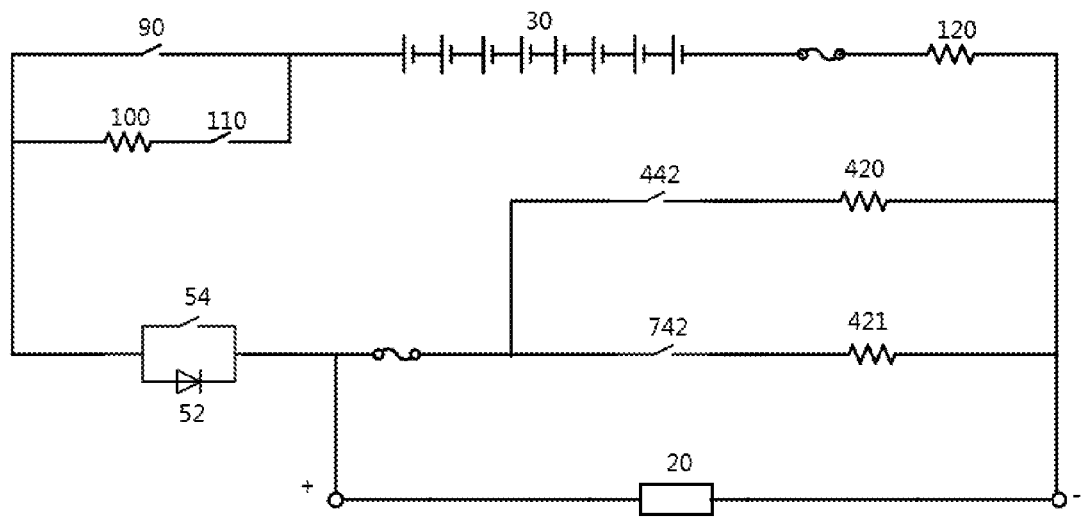
FIG. 3 is a schematic structural diagram of a lithium-ion battery system according to an embodiment of the present invention.

In an embodiment, the first switch module 50 may be a combination of a diode 52 and a contactor 54 (which may be a low-temperature contactor) connected in parallel, as shown in FIG. 3.

When the difference between the first voltage and the second voltage is greater than the preset voltage and the temperature of the battery is less than or equal to the preset temperature, the first control unit 220 configured to control the first switch module 50 to unidirectionally cut off the main circuit may include: controlling the contactor to be off so as to unidirectionally cut off the main circuit by the diode. At the moment, the first switch module 50 is equivalent to a diode, which is used to unidirectionally cut off the main circuit. That is, the current may flow from A to B (discharging of the battery is allowed), but the current may not flow from B to A (charging to the battery is prohibited).

When the difference between the first voltage and the second voltage is greater than the preset voltage and the temperature of the battery is greater than the preset temperature, a second control unit 221 is configured to control the first switch module 50 to turn on the main circuit such that the driver charges the battery (details are given below). At the moment, the first switch module 50 is equivalent to a wire, which is used to turn on the main circuit. That is, the current may flow from B to A (charge the battery).

In the embodiment, the first switch module 50 has the advantage of low cost.

Figure 4:
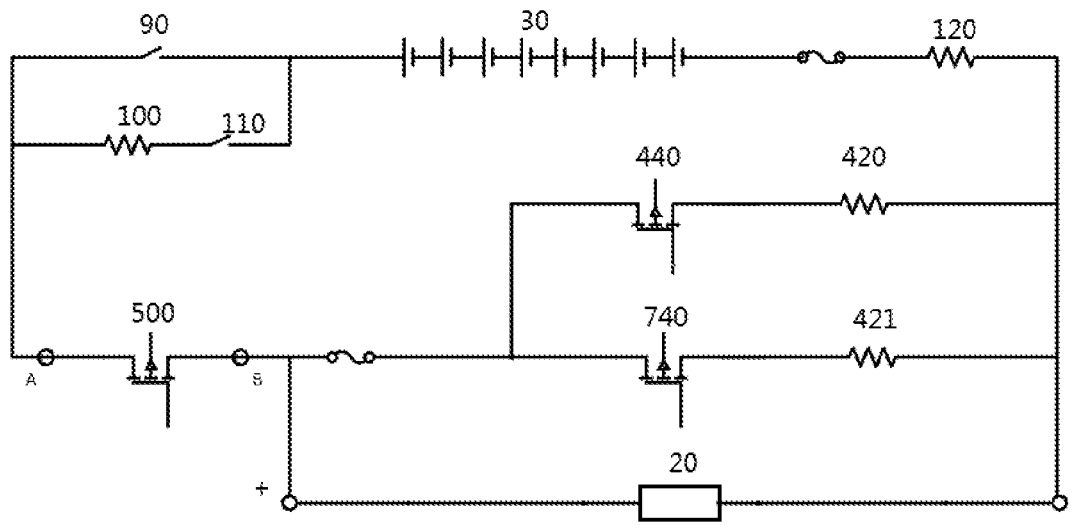
FIG. 4 is a schematic structural diagram of a lithium-ion battery system according to an embodiment of the present invention.

In another embodiment, the first switch module 50 may be a first field-effect transistor (an MOS transistor 500 as shown in FIG. 4) with a chip.

The first control unit 220 configured to control the first switch module 50 to unidirectionally cut off the main circuit may include: controlling the chip of the first field-effect transistor to unidirectionally cut off the main circuit. At the moment, the first field-effect transistor (i.e., MOS transistor 500) is equivalent to a diode, which is used to unidirectionally cut off the main circuit. That is, the current may flow from A to B (discharging of the battery is allowed), but the current may not flow from B to A (charging to the battery is prohibited).

When the difference between the first voltage and the second voltage is greater than the preset voltage and the temperature of the battery is greater than the preset temperature, the second control unit 221 is configured to control the first switch module 50 to turn on the main circuit such that the driver charges the battery (details are given below). At the moment, the first switch module 50 is equivalent to a wire, which is used to turn on the main circuit. That is, the current may flow from B to A (charge the battery).

In the embodiment, the first switch module 50 has the advantages that a size is smaller, which is beneficial to the arrangement of a circuit board; and an internal resistance is smaller: when the current of the main circuit is heavier, the voltage drop is smaller (thereby less heat is generated), so less feedback energy is dissipated.

Under the action of the factors such as the thermal energy converted by the first current capture device 40, the temperature of the battery 30 gradually rises. When the temperature of the battery is greater than the preset temperature and the difference between the first voltage $U_B$ at one end of the driver 20 and the second voltage $U_A$ at one end of the battery 30 on the main circuit is greater than the preset voltage (indicating that the electric motor generates electromotive force, for example, the preset voltage is 0 V), since charging the battery at the moment may not pose the risk of lithium precipitation, the main circuit is turned on by the first switch module 50, and consequently, the feedback electric energy generated by the electric motor may be used to charge the battery.

In order to conveniently control the current capture circuit to be turned on or off, in an embodiment of the present invention, the first current capture device 40 may further include: a second switch module 44, configured to turn on or off the first current capture circuit, as shown in FIG. 2. In the case where the second switch module 44 is provided, the second switch module 44 is required to be turned on, and then, the process of capturing the feedback current by the first feedback current capture module is performed.

Under the condition that the first current capture device 40 further includes the second switch module 44, the control module 200 may further include: a second control unit 221, configured to, under the condition that the difference between the first voltage and the second voltage is greater than the preset voltage and the temperature of the battery 30 is greater than the preset temperature, perform the following operations: controlling the second switch module 44 to turn off the first current capture circuit; and controlling the first switch module 50 to turn on the main circuit such that the driver 20 charges the battery 30 (the specific charging process will be described below).

In addition, since the electric motor generates a heavy feedback current in the braking process, in an embodiment, another current capture circuit (for example, a second current capture circuit) connected in parallel with the first current capture circuit may be further disposed (of course, a plurality of current capture circuits connected in parallel with each other may be disposed) to reduce the current of each of the current capture circuits, and an switch module configured to turn on or cut off the circuit may be disposed in the second current capture circuit.

Specifically, the feedback current control device 10 may further include: a second current capture device 70. The second current capture device 70 is located on a second current capture circuit connected in parallel with the first current capture circuit. The second current capture device 70 may include: a second feedback current capture module 72, configured to capture the feedback current; and a third switch module 74, configured to turn on or off the second current capture circuit, as shown in FIG. 2. Correspondingly, the second control unit 221 is further configured to, under the condition that the difference between the first voltage and the second voltage is greater than the preset voltage and the temperature of the battery 30 is less than or equal to the preset temperature, control the second switch module 44 and the third switch module 74 to turn on the first current capture circuit and the second current capture circuit such that the first feedback current capture module 42 and the second feedback current capture module 72 jointly capture the feedback current. Thereby, in the embodiments of the present invention, the current flowing through the switch module of each of the current capture circuits can be reduced, thereby greatly enhancing the reliability of the switch module.

Wherein the second switch module 44 is a second field-effect transistor (which may be referred to as an MOS transistor 440, as shown in FIG. 4) or a contactor 442 (as shown in FIG. 3); and the third switch module 74 may be a third field-effect transistor (which may be referred to as an MOS transistor 740, as shown in FIG. 4) or a contactor 742 (as shown in FIG. 3).

The process of charging the battery will be described in detail below.

In the process of charging the battery, a pulse-width modulation (PWM) signal may be regulated according to the difference between the magnitude of the feedback electromotive force (i.e., $U_B$) and the second voltage (i.e, $U_A$) to control the on-off time of the second switch module 44, so as to ensure sufficient absorption of the feedback energy while minimizing "electricity stealing" (the "electricity stealing" means that in the process of absorbing feedback energy, the charging power of the battery is greater than the feedback power, so as to lead to $U_A > U_B$, so that the battery suffers from discharging). Specifically, in an embodiment, the second control unit 221 is further configured to regulate the on-off time of the second switch module 44 according to the difference between the first voltage ($U_B$) and the second voltage ($U_A$), so as to ensure that the driver 20 charges the battery 30.

In the embodiment, the control module 200 (for example, the BMS) may be used to control the pulse-width modulation (PWM) duty cycle by a PI control algorithm according to the difference between the first voltage $U_B$ at one end of the driver 20 and the second voltage $U_A$ on the main circuit, so as to control the on-off time of the second switch module 44, thereby realizing the precise control on the voltage division of the feedback electromotive force and further ensuring that the voltage $U_B$ in the main circuit is greater than $U_A$ (that is, the absorbed power in the main circuit is less than the feedback power). Specifically, once it is detected that the difference between $U_B$ and $U_A$ is less than another preset voltage (for example, 0.2 V), the PI control algorithm is used to reduce the pulse-width modulation (PWM) duty cycle so as to maintain the difference between $U_B$ and $U_A$ to be about 0.2 V. Therefore, in the embodiment, the battery can be charged according to $U_B$, and the excess feedback energy is consumed by the first feedback current capture module 42 on the first current capture circuit, so that "electricity stealing" is avoided, which is thereby conducive to the battery life of the equipment.

Under the condition that the current capture circuit is composed of the first current capture circuit and the second current capture circuit connected in parallel with each other, the second control unit 221 is further configured to respectively regulate the on-off time of the second switch module 44 and the third switch module 74 according to the difference between the first voltage ($U_B$) and the second voltage ($U_A$), so as to ensure that the driver 20 charges the battery 30.

On the premise of satisfying a minimum braking distance, a maximum value of the pulse feedback current is reduced as much as possible, so as to flatten the waveforms of the pulse feedback current, thereby reducing the impact on the battery. In the embodiment of the present invention, an electricity generation current of the electric motor may be controlled. The details are given in the description below.

In another embodiment, the control module 200 may further include: a determining unit (not shown), configured to determine an electricity generation current of an electric motor 80 according to a target speed and an actual speed of the electric motor 80 and braking time of an aerial equipment; and a sending unit (not shown), configured to send the determined electricity generation current to the driver 20, so as to allow the driver 20 to control the electric motor 80 to generate electricity based on the electricity generation current.

The determining unit (not shown) configured to determine the electricity generation current may include: determining that the electricity generation current is a maximum electricity generation current under the condition that the target speed, the actual speed and the braking time satisfy a preset condition, wherein the preset condition is that the braking time is less than preset braking time or a difference between the target speed and the actual speed is greater than a preset speed difference; or determining the electricity generation current according to a minimum electricity generation current, maximum allowable braking time and a maximum electricity generation current when the target speed, the actual speed and the braking time do not satisfy the preset condition.

Wherein the minimum electricity generation current means that the electricity generation based on the current can satisfy the requirement of the minimum braking distance under non-extreme conditions (for example, running at a speed of 6 km/h on a flat ground). The minimum electricity generation current can usually be expressed in terms of a percentage of the maximum electricity generation current.

Wherein the determining unit (not shown) configured to determine the electricity generation current according to the minimum electricity generation current, the maximum allowable braking time and the maximum electricity generation current may include: determining the electricity generation current according to the minimum electricity generation current $I_{min}$, the maximum allowable braking time $T_{max}$, the maximum electricity generation current $I_{max}$ and the following formula (1), $$I = \left[1 - \frac{(I_{min} - 1)(t - 1)}{(T_{max} - 1)}\right] \times I_{max}, \quad (1)$$

where the values of the $I_{max}$, $I_{min}$ and $T_{max}$ need to be determined according to the specific vehicle models and working conditions, and t is the braking time (which can be set in advance according to actual needs).

Specifically, the electricity generation current may be calculated according to the following rules.

When the braking time is less than 1 s (for example, the preset braking time), the electricity generation current=100% $I_{max}$. A sudden stop operation usually requires a short braking distance and thereby the maximum braking power is required. Usually, the electricity generation current for the sudden stop operation is set to 100% $I_{max}$.

When the difference between the target speed and the actual speed is large (for example, the difference may be 500 rpm, and a preset speed difference may be 200 rpm (but this preset speed is not limited to 200 rpm)), the electricity generation current=100% $I_{max}$. At the moment, the resistance of the aerial equipment is large, the aerial equipment may go uphill, and kinetic energy that can be converted into electric energy decreases. The generated power is not high, so the peak feedback current is not high.

In other cases, the electricity generation current may be calculated according to the above formula (1).

After the electricity generation current is calculated, the control module 200 sends the electricity generation current to the driver 20 through a CAN bus, and the driver 20 controls the electric motor 80 to generate electricity based on the electricity generation current. Thus, in the embodiment, without affecting the braking performance, the feedback energy can be controlled to be output smoothly, the impact feedback current is decreased and thereby, the impact on the battery is alleviated.

When the difference between the first voltage $U_B$ at one end of the driver 20 and the second voltage $U_A$ at one end of the battery 30 on the main circuit is less than or equal to the preset voltage (for example, the preset voltage is 0 V, when $U_B$ is less than or equal to $U_A$, it indicates that the electric motor does not generate electromotive force), the second switch module 44 may be controlled to turn off the first current capture circuit, and the first switch module 50 may be controlled to unidirectionally cut off the main circuit, thereby prohibiting the driver from charging the battery.

Specifically, the second control unit 221 is further configured to, under the condition that the difference between the first voltage and the second voltage is less than or equal to the preset voltage, perform the following operations: controlling the second on-cut off module 44 to cut off the first current capture circuit; and controlling the first switch module 50 to unidirectionally cut off the main circuit to only allow the battery 30 to supply electricity to the driver 20.

Wherein, the first feedback current capture module 42 or the second feedback current capture module 72 is one of an energy consumption module (not shown), an energy storage module (not shown) and a heating module. Specifically, the energy consumption module (not shown) may be a braking resistor; the energy storage module (not shown) may be a supercapacitor (not shown) or a storage battery (not shown); or the heating module may be a heating film (a heating film 420 and a heating film 421 as shown in FIG. 3 or FIG. 4).

Wherein, the heating module may be arranged in cooperation with the position of a module of the battery 30. The module of the battery 30 includes at least one cell. Specifically, heating films may be arranged on four sides of the module of the battery 30, a certain gap is left between the adjacent cells, and a temperature sensor is arranged at the center. When the temperature sensor detects that the temperature of the cells is lower than 0° C., the heating films start to charge the module of the battery 30. This layout has the advantages that when the ambient temperature is too low, heat transferred from the heating films to the cells during heating is more uniform, so there is small temperature difference between the cells; and when the ambient temperature is too high, the heat of the cells inside the module is not too concentrated to be dissipated. Moreover, this structure is simple in arrangement and easy to install.

It should be noted that the power of the braking resistor, the supercapacitor (not shown), the storage battery (not shown) or the heating film needs to not only satisfy the requirement of the braking distance, but also ensure that the regenerated electromotive force is less than a protection voltage of the driver, which can be determined according to existing algorithms.

Specifically, in the embodiment, the first feedback current capture module 42 or the second feedback current capture module 72 may be an energy storage module, which has the following advantages: after the feedback energy is absorbed, the main circuit may supply electricity to the battery, which makes the energy utilization higher and is more conducive to saving energy and prolonging the battery life of the equipment.

In another embodiment, the first feedback current capture module 42 or the second feedback current capture module 72 may be a braking resistor, which has the advantages of low cost and small size (easy installation on an aerial equipment with a limited space). Furthermore, in the actual braking process, affected by the resistance of the braking resistor and the braking distance, the current of the main circuit may fluctuate around the preset current (for example, 0 A), so that the first switch module 50 is frequently turned on and off. Under the condition that the braking resistor is a wire wound resistor (not shown), due to the inductance of the wire wound resistor, the frequent on/off of the first switch module 50 may cause a higher induced electromotive force across the braking resistor, which may damage the first switch module 50 and even affect the circuit in the driver 20 in the case of long-term use. Therefore, in order to avoid the risk, in a more preferred embodiment, a semiconductor element (for example, a freewheeling diode) may be connected in parallel with the braking resistor and used to consume the induced electromotive force generated by the wire wound resistor.

In still another embodiment, the first feedback current capture module 42 or the second feedback current capture module 72 may be a heating module (for example, a heating film), which has the advantages that the thermal energy generated by the heating module may be used to heat the battery 30, so that the temperature of the battery can quickly rise to the preset temperature, which makes the energy utilization higher and is more conducive to prolonging the battery life.

Under the condition that the first switch module 50 fails, an aerial equipment under normal working conditions cannot be moved to an emergency maintenance station and repaired by relevant maintenance personnel since the battery 30 cannot supply electricity to the aerial equipment.

In the embodiment of the present invention, a bypass switch 230 connected in parallel with the first switch module 50 may be further provided, and supplying electricity to the driver 20 from the battery 30 may be maintained by closing the bypass switch 230. Specifically, the feedback current control device 10 may further include: a bypass switch 230 that is connected in parallel with the first switch module 50. Correspondingly, the control module 200 may further include: a third control unit 222, configured to control the bypass switch 230 to be closed such that the battery 30 supplies electricity to the driver 20 under the condition that the first switch module 50 fails.

Figure 5:
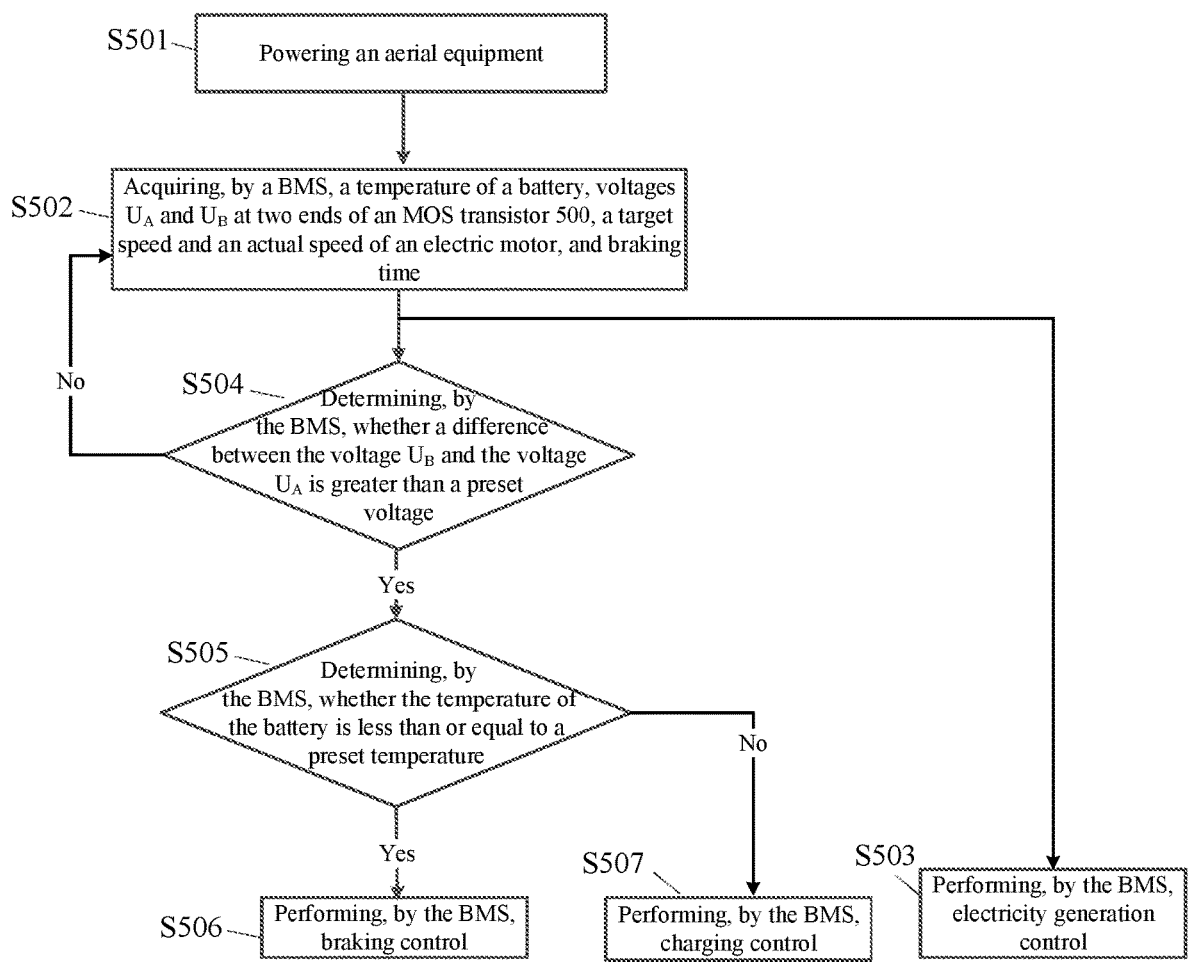
FIG. 5 is a flow chart of a charging control process for a battery according to an embodiment of the present invention.

Specifically, the charging control process for the battery will be explained and described below by taking a lithium-ion battery system shown in FIG. 4 as an example, as shown in FIG. 5.

As shown in FIG. 5, the charging control process for the battery may include steps S501-S507 as follows.

In step S501, powering an aerial equipment.

In step S502, acquiring, by a BMS, a temperature of a battery, voltages $U_A$ and $U_B$ at two ends of an MOS transistor 500, a target speed and an actual speed of an electric motor, and braking time.

The voltage ($U_A$) at the front end of the MOS transistor 500 and the voltage ($U_B$) at the rear end of the MOS transistor 500 are acquired by the BMS through an A/D converter. Other data may be directly acquired by the BMS.

In step S503, performing, by the BMS, electricity generation control.

Electricity generation control: the BMS may determine an electricity generation current of the electric motor 80 according to the target speed and the actual speed of the electric motor 80 and the braking time of the aerial equipment (for the specific process, reference can be made to the description above, and details will not be repeated here); and then the BMS sends the determined electricity generation current to a driver 20, and the driver 20 controls the electric motor 80 to generate electricity based on the electricity generation current.

The purpose of controlling the electricity generation current is to reduce a maximum value of the pulse feedback current as much as possible while satisfying a minimum braking distance so as to flatten the waveforms of the pulse feedback current, thereby reducing the impact on the battery and also facilitating the precise control of the control system. Another benefit of controlling the electricity generation current is that a peak voltage at a point B can be suppressed, thereby avoiding the overvoltage alarm of the driver.

In step S504, determining, by the BMS, whether a difference between the voltage $U_B$ and the voltage $U_A$ is greater than a preset voltage, if so, step S505 is performed, otherwise, step S502 is performed again.

If the difference between the voltage $U_B$ and the voltage $U_A$ is greater than the preset voltage (for example, 0 V), it indicates that the electric motor generates a heavy feedback current, and then step S505 needs to be further performed to determine, according to the temperature of the battery, whether the battery can be charged; otherwise, it indicates that the electric motor does not generate a heavy feedback current, and step S502 is performed again.

In step S505, determining, by the BMS, whether the temperature of the battery is less than or equal to a preset temperature, if so, step S506 is performed, otherwise, step S507 is performed.

When the difference between the voltage $U_B$ and the voltage $U_A$ is greater than the preset voltage (for example, 0 V) and the temperature of the battery is less than or equal to the preset temperature (for example, 0° C.), it indicates that charging the battery at the moment may pose a risk of lithium precipitation. At the moment, step S506 is performed to perform braking control. That is, the heavy feedback current is diverted to the current capture circuit, and the feedback current is consumed, for example, through a heating film 420 and a heating film 421, that is, charging is not performed on the battery 30.

When the difference between the voltage $U_B$ and the voltage $U_A$ is greater than the preset voltage (for example, 0 V) and the temperature of the battery is greater than the preset temperature (for example, 0° C.), it indicates that charging the battery at the moment may not pose a risk of lithium precipitation. At the moment, step S507 is performed to perform charging control. That is, the battery is charged with limited charging power.

In step S506, performing, by the BMS, braking control.

When the difference between the voltage $U_B$ and the voltage $U_A$ is greater than the preset voltage (for example, 0 V) and the temperature of the battery is less than or equal to the preset temperature (for example, 0° C.), braking control is enabled.

Braking control: the BMS turns off a contactor 54 so as to unidirectionally cut off the circuit for the driver to charge the battery, and controls an MOS transistor 440 to turn on a first current capture circuit and controls an MOS transistor 740 to turn on a second current capture circuit where the MOS transistor 740 is located (that is, to turn on a braking loop). At the moment, all the feedback currents are consumed by the heating film 420 and the heating film 421, thereby avoiding charging the battery. The purpose of braking control is to avoid the risk of lithium precipitation of the battery caused by the pulse feedback current when the battery is at low temperature.

In step S507, performing, by the BMS, charging control.

When the difference between the voltage $U_B$ and the voltage $U_A$ is greater than the preset voltage (for example, 0 V) and the temperature of the battery is greater than the preset temperature (for example, 0° C.), charging control is enabled.

Charging control: the BMS controls the contactor 54 to (bidirectionally) turn on the main circuit, controls the MOS transistor 440 to turn on the first current capture circuit and controls the MOS transistor 740 to turn on the second current capture circuit where the MOS transistor 740 is located, and meanwhile, respectively controls on-off time of the MOS transistor 440 and the MOS transistor 740 by controlling a PWM duty cycle by using a PI control algorithm according to the difference between $U_B$ and $U_A$, thereby regulating the voltage division of the feedback current in the current capture circuit, i.e., realizing precise control on a braking voltage, and finally ensuring that the voltage $U_B$ in the main circuit to be greater than $U_A$. The purpose of charging control is to avoid "power stealing".

In conclusion, in an inventive way, the first switch module is used to unidirectionally cut off the main circuit (that is, only turn off the unidirectional circuit for the driver to charge the battery) under the condition that the difference between the first voltage at one end of the driver and the second voltage at one end of the battery on the main circuit is greater than the preset voltage and the temperature of the battery is less than the preset temperature (for example, 0° C.). Thereby, when charging is performed at low temperature, the feedback current capture module can capture all the feedback currents, so that the risk of lithium precipitation of the battery caused by the pulse feedback current when charging is performed at low temperature can be effectively avoided, thereby greatly reducing the probability of lithium precipitation of the battery and the risk of thermal runaway of the battery and enhancing the safety of the battery.

The lithium-ion battery system may further include: a contactor 90, a pre-charge resistor 100, a pre-charge relay 110 and a current divider 120. Wherein the arrangement of these devices is not an improvement of the present invention, and the functions of the devices are not described in detail here. The corresponding descriptions of the functions in the prior art can be cited here.

Figure 6:
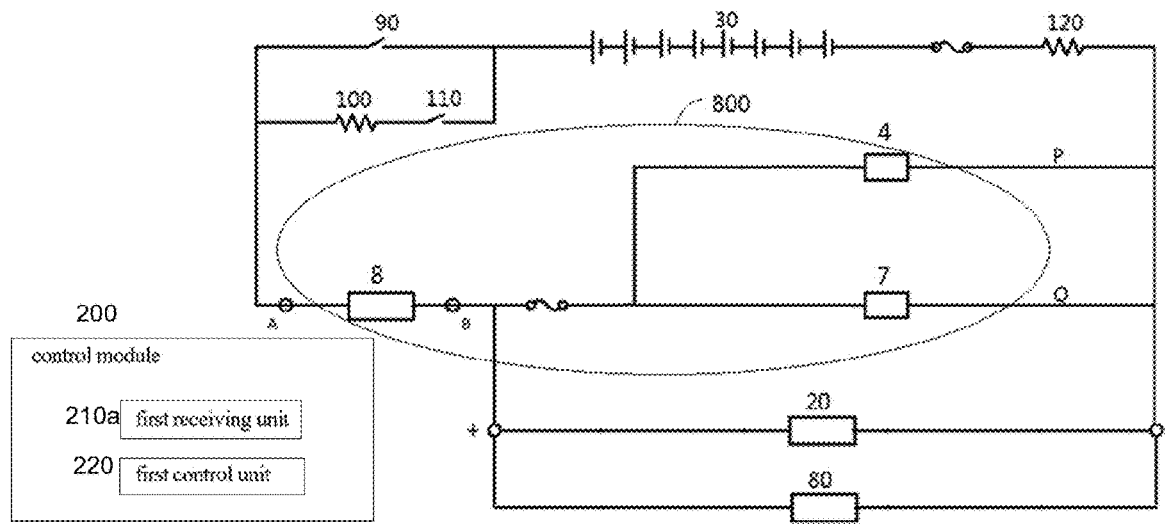
FIG. 6 is a schematic structural diagram of a lithium-ion battery system according to an embodiment of the present invention.

FIG. 6 is a structural diagram of a lithium-ion battery system according to an embodiment of the present invention. As shown in FIG. 6, the lithium-ion battery system may include: a battery (i.e., lithium-ion battery) 30; and a feedback current control device 800. A power circuit between the battery 30 and a driver 20 may include: a main circuit between the battery 30 and the driver 20; and a current capture circuit configured to divide a feedback current delivered by the driver 20. The current capture circuit includes a plurality of current capture branches (for example, a current capture branch P, a current capture branch Q, . . . ) connected in parallel with each other. The feedback current control device 800 may include: a plurality of current capture module groups (for example, a current capture module group 4 and a current capture module group 7) and a control module 200 (for example, BMS). The plurality of current capture module groups (for example, the current capture module group 4 and the current capture module group 7) are located on the plurality of current capture branches and are in one-to-one correspondence with the plurality of current capture branches (i.e., the current capture module group 4 is located on the current capture branch P; and the current capture module group 7 is located on the current capture branch Q).

Figure 7:
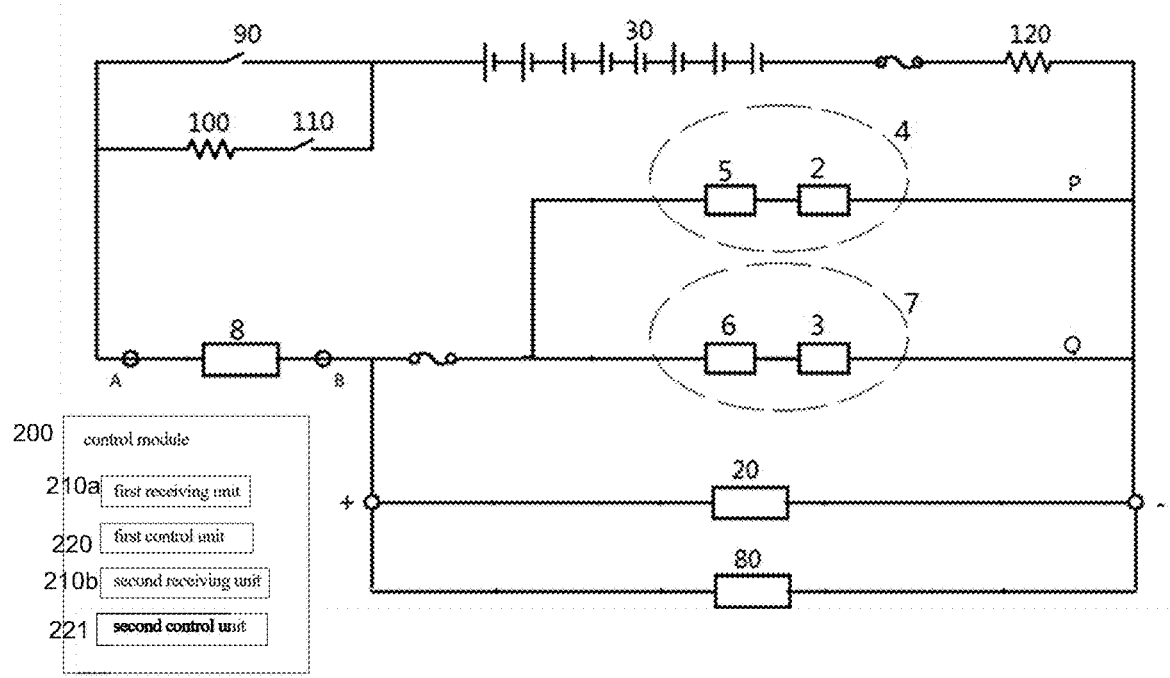
FIG. 7 is a schematic structural diagram of a lithium-ion battery system according to an embodiment of the present invention.
Figure 8A:
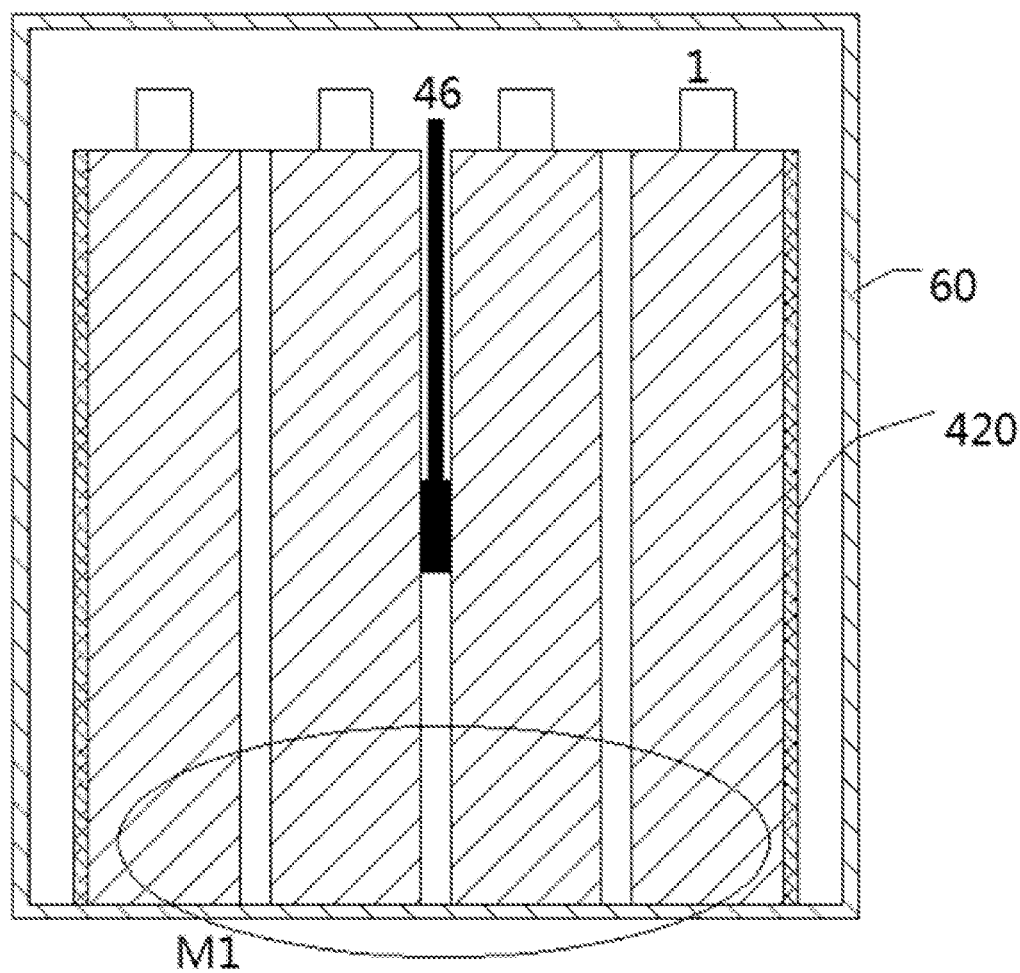
FIG. 8(a) is a front view of a module M1 of a battery according to an embodiment of the present invention.
Figure 8B:
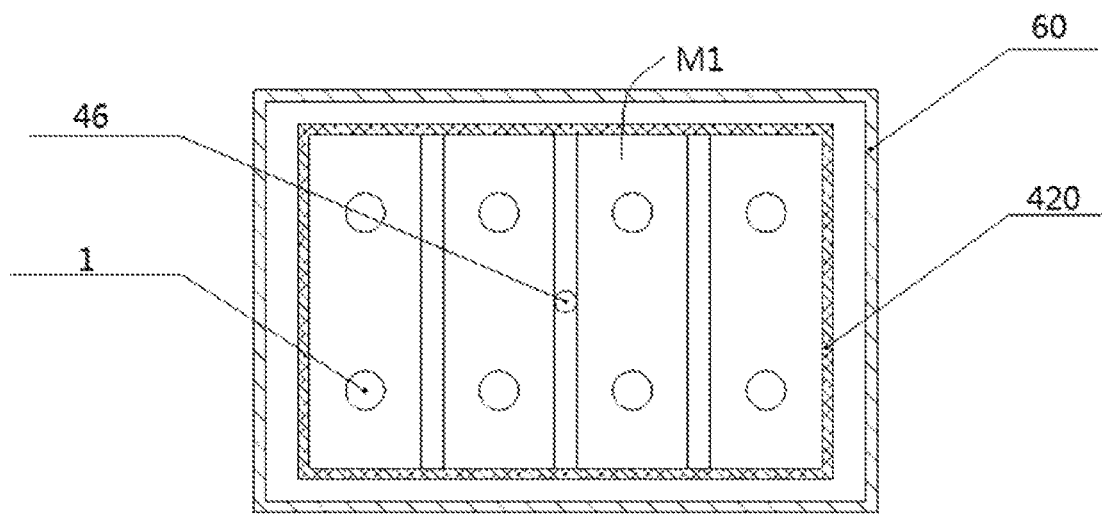
FIG. 8(b) is a top view of the module M1 of the battery according to an embodiment of the present invention.

The battery 30 may include: a plurality of modules (for example, modules M1 and M2). Any one of the plurality of modules (for example, the module M1) includes at least one cell 1, as shown in FIG. 8(a) or FIG. 8(b). A gap between the at least one cell 1 is greater than a preset gap. The advantage of the layout of the modules can be found in the description above. Besides, a corresponding battery box 60 may be further disposed to protect the battery, as shown in FIG. 8(a) or FIG. 8(b). It should be noted that the battery in the respective embodiments of the present invention may refer to a lithium-ion battery.

Wherein each of the plurality of current capture module groups (for example, the current capture module group 4 or the current capture module group 7) may include: a heating module (for example, a heating module 2 or a heating module 3 in FIG. 7), arranged in cooperation with the position of a corresponding module of the battery (i.e., the heating modules are in one-to-one correspondence with the modules of the battery), and configured to capture the feedback current and convert the feedback current into thermal energy so as to heat the module corresponding to the heating module; and a first switch module (for example, a first switch module 5 or a first switch module 6 in FIG. 7), configured to turn on or off a current capture branch where the first switch module is located.

Wherein the first switch module may be a field-effect transistor or a contactor. For example, the first switch module 5 is a field-effect transistor 440 (which may be referred to as an MOS transistor 440, as shown in FIG. 4) or a contactor 442 (as shown in FIG. 3); or the first switch module 6 may be a field-effect transistor 740 (which may be referred to as an MOS transistor 740, as shown in FIG. 4) or a contactor 742 (as shown in FIG. 3).

Wherein the control module 200 may include: a first receiving unit 210a, configured to receive a first voltage at one end of the driver 20 and a second voltage at one end of the battery 30 on the main circuit and an average temperature of the battery; and a first control unit 220, configured to, according to a difference between the first voltage and the second voltage and the average temperature of the battery 30, perform the following operations: controlling the first switch module in each of the current capture module groups to turn on the current capture branch where the first switch module is located under the condition that the difference between the first voltage and the second voltage is greater than a preset voltage and the average temperature of the battery 30 is less than or equal to a preset temperature such that the feedback current is converted into thermal energy by the heating module in each of the current capture module groups and the module corresponding to the heating module is heated by the converted thermal energy. Wherein the average temperature of the battery may be obtained based on the temperature acquired by a temperature sensor in each of the current capture module groups.

In the perspective of a circuit connection manner, a first end of the main circuit is connected to a positive electrode of the driver 20, and the other end of the main circuit is connected to a positive electrode of the battery 30. One end of the current capture circuit is connected to a point B on the main circuit (i.e., the positive electrode of the driver), and the other end of the current capture circuit is connected to a negative electrode of the driver. the current capture circuit is used for restraining the pulse feedback current from charging the battery when the battery is at low temperature to prevent the battery from lithium precipitation, thereby prolonging the battery life of equipment. Moreover, according to the embodiment of the present invention, since each of the heating modules is arranged in cooperation with the position of the corresponding module of the battery, the battery can be heated quickly and uniformly. Thereby, the problem of local overheating in the battery may not occur, and also some thermal energy can even be absorbed.

Specifically, when the difference between the first voltage $U_B$ at one end of the driver 20 and the second voltage $U_A$ at one end of the battery 30 on the main circuit is greater than the preset voltage (indicating that the electric motor generates electromotive force, for example, the preset voltage is 0 V) and the temperature of the battery is lower than the preset temperature (for example, 0° C.), the feedback energy (feedback current) generated is completely converted into thermal energy by the heating module to be consumed, and is not delivered to the battery 30 (cannot charge the battery 30). At the same time, the converted thermal energy can be directly used to heat the module of the battery corresponding to each of the heating modules. Hence, in the embodiment, when the battery 30 is at low temperature (for example, the temperature of the battery is less than 0° C.), the feedback current generated by the electric motor is effectively captured without affecting the user's operation experience, which thereby is beneficial to prolonging the battery life of an aerial equipment. Since the battery does not need to be heated, a user can operate the equipment without waiting for the battery to be preheated, which improves the operation experience on the equipment. In addition, when the equipment works, the temperature of the battery can be maintained to be 0° C. or above without consuming the energy of the battery, so that the consumption of electric energy is reduced, which is conducive to saving energy and prolonging the battery life of the equipment.

Wherein power of the heating module is greater than preset power. The heating modules may be heating films (for example, a heating film 420 and a heating film 421 in FIG. 3 or FIG. 4, which are respectively arranged in cooperation with the positions of the modules M1 and M2) or a heat exchanger (not shown, for example, a gas heat exchanger or a liquid heat exchanger). For example, the power of the heating films is at least more than 10 times the preset power. The preset power may be determined based on the power of a heating unit in the prior art (for example, the preset power may be equal to the power of the heating unit in the prior art). Compared with a solution of capturing the feedback current with the braking resistor (when the equipment goes downhill along a long slope at low temperature, potential energy is converted into thermal energy which is consumed by the braking resistor, which may cause the temperature of the braking resistor to exceed its design temperature), the solution in the embodiment is as follows: since the power of the heating module is high, the thermal energy converted from potential energy generated by the equipment going downhill can quickly help the temperature of the battery to increase to the preset temperature (for example, 0° C.), so that the not only is the problem of overheating of the braking resistor avoided, and also part of the potential energy generated by the equipment going downhill can be absorbed.

In order to prevent the heat absorbed by the heating films from being concentrated in a local area to further avoid causing local overheating in the battery, the heating module is arranged at a periphery of the module of the battery corresponding to the heating module. For example, the heating film (for example, the heating film 420 in FIG. 3 or FIG. 4) is configured to surround the periphery of the module M1 of the battery, as shown in FIG. 8(a) or FIG. 8(b). In an embodiment, the layout of the module M1 of the battery and the heating film 420 is designed as follows: the heating film 420 is arranged on four sides of the module M1 of the battery, a certain gap is left between the adjacent cells 1, and a temperature sensor 46 is arranged at the center. The layout manner has the advantages that when the ambient temperature is low, heat transferred from the heating film to the cells during heating is uniform (there is a smaller temperature difference between the cells, details are given below); and when the ambient temperature is high, the heat of the cells inside the module is not too concentrated to be dissipated. Moreover, this structure is simple in arrangement and easy to install.

When the aerial equipment is not in an operation state and the average temperature of the battery is low, one current capture branch can be controlled to be turned on at each time point, so that the heating power of the heating modules in the whole current capture circuit can be reduced (in the process of capturing the feedback current, the plurality of heating modules in the whole current capture circuit jointly heat the battery, so that the total heating power of all the heating modules is higher). The charging process needs to be completed by the aid of a charger, so that the capacity of the charger can be correspondingly reduced, thereby improving the safety of the battery.

Specifically, the heating module (for example, the heating module 2 or the heating module 3 in FIG. 7) is further configured to capture a charging current provided by the driver 20 and convert the charging current into thermal energy so as to heat the module corresponding to the heating module. Correspondingly, the control module 200 may further include: a second receiving unit 210b, configured to receive an electric quantity of the battery 30, and a second control unit 221, configured to control the first switch module in each of the current capture module groups to turn on the corresponding current capture branch by a time-sharing control strategy under the condition that the battery is in a charging awake state (indicating that the aerial equipment is not in the operation state) and a difference between the preset temperature and the average temperature of the battery is greater than a preset temperature difference, such that a charging current provided by the driver is converted into thermal energy by the heating module on the corresponding current capture branch, and the module corresponding to the heating module is heated by the converted thermal energy.

Wherein the preset temperature difference may be set to be a value close to but greater than the preset temperature (for example, the preset temperature difference is 3° C.). When the preset temperature is 0° C., if the difference between the preset temperature and the average temperature of the battery is greater than the preset temperature difference, it indicates that the average temperature of the battery is less than −3° C. (i.e., the average temperature is low); and if the battery is in the charging awake state and the difference between the preset temperature and the average temperature of the battery is greater than the preset temperature difference, it indicates that normal charging needs to be performed on the battery at the moment.

The time-sharing control strategy is to determine, according to the power of the heating module in each of the current capture module groups, a preset cycle during which the first switch module in each of the current capture module groups is controlled to turn on the corresponding current capture branch. The preset cycle during which the first switch module in each of the current capture module groups is controlled to turn on the corresponding current capture branch is inversely proportional to the power of the heating module in each of the current capture module groups. For example, under the condition that the power of the heating module 2 is twice the power of the heating module 3, the preset cycle during which the first switch module 5 is controlled to turn on the corresponding current capture branch is equal to half of the preset cycle during which the first switch module 6 is controlled to turn on the corresponding current capture branch; and under the condition that the power of the heating module 2 is equal to the power of the heating module 3, the preset cycle during which the first switch module 5 is controlled to turn on the corresponding current capture branch is equal to the preset cycle during which the first switch module 6 is controlled to turn on the corresponding current capture branch.

In the embodiment, if the plurality of current capture branches are two current capture branches P and Q, correspondingly, the plurality of current capture module groups are two current capture module groups 4 and 7, as shown in FIG. 3. Under the condition that the power of the heating module 2 is equal to the power of the heating module 3, the first switch module 5 and the first switch module 6 are controlled to alternately turn on the corresponding single current capture branch according to the fixed preset cycles. For example, in a first cycle T, the first switch module 5 is controlled to turn on the current capture branch where the first switch module 5 is located, meanwhile, part of the charging current is converted into thermal energy by the heating module 2, and the obtained thermal energy may be used to heat the module corresponding to the heating module 2; in a second cycle T, the first switch module 6 is controlled to turn on the current capture branch where the first switch module 6 is located, meanwhile, part of the charging current is converted into thermal energy by the heating module 3, and the obtained thermal energy may be used to heat the module corresponding to the heating module 3; and by analogy, in an odd-numbered cycle T, the first switch module 5 is controlled to turn on the current capture branch where the first switch module 5 is located, and in an even-numbered cycle T, the first switch module 6 is controlled to turn on the current capture branch where the first switch module 6 is located. Thereby, when normal charging is performed on the battery, the battery may also be heated by the heating module on the single current capture branch during each cycle T.

In order to avoid local overheating of the battery (i.e., large temperature difference between the modules), in the process of performing normal charging on the battery, when the average temperature of the battery 30 is close to but less than the preset temperature (for example, 0° C.), the on-off time of the respective first switch modules corresponding to the respective modules may be regulated according to the temperatures of the respective modules of the battery 30. Therefore, the module with lower temperature can be effectively heated for a long time to compensate for the large temperature difference from the other modules, thereby enhancing the safety of the battery.

Specifically, each of the current capture module groups may further include: a temperature sensor (a temperature sensor 46 in the current capture module group 4 as shown in FIG. 8), configured to acquire a temperature of the module (for example, the module M1) corresponding to the heating module (the heating film 420 as shown in FIG. 8). Correspondingly, the second control unit 221 is further configured to, under the condition that the electric quantity of the battery 30 is less than a preset electric quantity and the difference between the preset temperature and the average temperature of the battery 30 is greater than 0 and less than or equal to the preset temperature difference, control the on-off time of the first switch module in each of the current capture module groups according to the temperatures of the respective modules of the battery 30, such that the battery 30 is uniformly heated by the heating modules in the plurality of current capture module groups.

In the embodiment, the higher the temperatures of the respective modules, the shorter the time for controlling the respective corresponding first switch modules to be on. When the temperature of the module M1 is equal to the temperature of the module M2, the on-off time of the first switch module 5 and the on-off time of the first switch module 6 are correspondingly equal; or under the condition that the temperature of the module M1 is −2° C. and the temperature of the module M2 is −1° C., the on time of the first switch module 5 may be 20 s and the on time of the first switch module 6 may be 8 s. Of course, in another embodiment, the on-off time of the first switch module in each of the current capture module groups may also be controlled according to the difference between the temperature of each module of the battery 30 and the preset temperature.

In the embodiments of the present invention, the advantages of using the parallel connection of multiple current capture branches are as follows: (1) in the process of capturing the feedback current, turning on multiple branches at the same time can reduce the current of the MOS transistor on the single branch, thereby enhancing the reliability of the MOS transistor; and (2) under the condition that the battery is in the charging awake state (being normally charged), the BMS may turn on the single branches by a time-sharing control strategy to reduce the charge heating power, thereby reducing the capacity of the charger and further enhancing the safety of the battery.

The feedback current control device 800 may further include: a second switch module 8. The second switch module 8 is located on the main circuit, and configured to turn on the main circuit, or unidirectionally cut off the main circuit to only allow the battery 30 to supply electricity to the driver 20. In the above process of capturing the feedback current, the second switch module 8 is required to be controlled to unidirectionally cut off the main circuit by the first control unit 220; or in the above process of performing normal charging on the battery, the second switch module 8 is required to be controlled to turn on the main circuit by the second control unit 221.

The first control unit 220 is further configured to, under the condition that the difference between the first voltage and the second voltage is greater than the preset voltage and the average temperature of the battery 30 is greater than the preset temperature, perform the following operations: controlling the second switch module 8 to turn on the main circuit such that the driver 20 charges the battery 30 (details are given below); and controlling the first switch module in each of the current capture module groups to turn on the corresponding current capture branch, and respectively regulating the on-off time of the first switch module in each of the current capture module groups according to the difference between the first voltage and the second voltage to ensure that the driver charges the battery. At the moment, the second switch module 8 is equivalent to a wire, which is used to turn on the main circuit. That is, the current may flow from B to A (charge the battery).

In an embodiment, the second switch module 8 may be a combination of a diode 52 and a contactor 54 (which may be a low-temperature contactor) connected in parallel, as shown in FIG. 3.

Under the condition that the difference between the first voltage and the second voltage is greater than the preset voltage and the temperature of the battery is less than or equal to the preset temperature, the first control unit 220 configured to control the second switch module 8 to unidirectionally cut off the main circuit may include: controlling the contactor 54 to be off so as to unidirectionally cut off the main circuit by the diode 52. At the moment, the first switch module 5 is equivalent to a diode, which is used to unidirectionally cut off the main circuit. That is, the current may flow from A to B (discharging of the battery is allowed), but the current may not flow from B to A (charging to the battery is prohibited).

When the difference between the first voltage and the second voltage is greater than the preset voltage and the average temperature of the battery is greater than the preset temperature, the first control unit 220 is configured to control the contactor 54 to be off so as to turn on the main circuit such that the driver 20 charges the battery 30 (details are given below). At the moment, the second switch module 8 is equivalent to a wire, which is used to turn on the main circuit. That is, the current may flow from B to A (charge the battery).

In the embodiment, the second switch module 8 has the advantage of low cost.

In another embodiment, the second switch module 8 may be a first field-effect transistor (an MOS transistor 500 as shown in FIG. 4) with a chip. The first control unit 220 configured to control the second switch module 8 to unidirectionally cut off the main circuit may include: controlling the chip of the first field-effect transistor to unidirectionally cut off the main circuit. At the moment, the first field-effect transistor (i.e., MOS transistor 500) is equivalent to a diode, which is used to unidirectionally cut off the main circuit. That is, the current may flow from A to B (discharging of the battery is allowed), but the current may not flow from B to A (charging to the battery is prohibited).

Under the condition that the difference between the first voltage and the second voltage is greater than the preset voltage and the average temperature of the battery is greater than the preset temperature, the first control unit 220 is configured to control the chip of the first field-effect transistor to turn on the main circuit such that the driver charges the battery (details are given below). At the moment, the second switch module 8 is equivalent to a wire, which is used to turn on the main circuit. That is, the current may flow from B to A (charge the battery).

In the embodiment, the second switch module 8 has the advantages: a size is smaller, which is beneficial to the arrangement of a circuit board; and an internal resistance is smaller: when the current of the main circuit is heavy, the voltage drop is smaller (thereby less heat is generated), so less feedback energy is dissipated.

Under the action of the factors such as the thermal energy converted by the heating module, the temperature of the battery 30 gradually rises. When the temperature of the battery is greater than the preset temperature and the difference between the first voltage $U_B$ at one end of the driver 20 and the second voltage $U_A$ at one end of the battery 30 on the main circuit is greater than the preset voltage (indicating that the electric motor generates electromotive force, for example, the preset voltage is 0 V), since charging the battery at the moment may not pose the risk of lithium precipitation, the main circuit is turned on by the second switch module 8, and consequently, the feedback electric energy generated by the electric motor may be used to charge the battery.

Specifically, in the process of charging the battery with the feedback current, a pulse-width modulation (PWM) signal may be regulated according to the difference between the magnitude of the feedback electromotive force (i.e., $U_B$) and the second voltage (i.e, $U_A$) to control the on-off time of the first switch module, so as to ensure sufficient absorption of the feedback energy while minimizing "electricity stealing" (the "electricity stealing" means that in the process of absorbing feedback energy, the charging power of the battery is greater than the feedback power, so as to lead to $U_A > U_B$, so that the battery suffers from discharging). Specifically, in an embodiment, the first control unit 220 is further configured to regulate the on-off time of the first switch module according to the difference between the first voltage ($U_B$) and the second voltage ($U_A$), so as to ensure that the driver 20 charges the battery 30.

In the embodiment, the control module 200 (for example, the BMS) may be used to control the pulse-width modulation (PWM) duty cycle by a PI control algorithm according to the difference between the first voltage $U_B$ at one end of the driver 20 and the second voltage $U_A$ on the main circuit, so as to control the on-off time of each first switch module, thereby realizing precise control on the voltage division of the feedback electromotive force and further ensuring that the voltage $U_B$ in the main circuit is greater than $U_A$ (that is, the absorbed power in the main circuit is less than the feedback power). Specifically, once it is detected that the difference between $U_B$ and $U_A$ is less than another preset voltage (for example, 0.2 V), the PI control algorithm is used to reduce the pulse-width modulation (PWM) duty cycle so as to maintain the difference between $U_B$ and $U_A$ to be about 0.2 V. Therefore, in the embodiment, the battery can be charged according to $U_B$, and the excess feedback energy is consumed by the heating module on the current capture circuit, so that "electricity stealing" is avoided, which is thereby conducive to the battery life of the equipment.

On the premise of satisfying a minimum braking distance, a maximum value of the pulse feedback current is reduced as much as possible, so as to flatten the waveforms of the pulse feedback current, thereby reducing the impact on the battery. The details are given in the description above and will not be repeated here.

When the difference between the first voltage $U_B$ at one end of the driver 20 and the second voltage $U_A$ at one end of the battery 30 on the main circuit is less than or equal to the preset voltage (for example, the preset voltage is 0 V, when $U_B$ is less than or equal to $U_A$, it indicates that the electric motor does not generate electromotive force), all the first switch modules may be controlled to turn off the current capture circuits, and the second switch module 8 may be controlled to unidirectionally cut off the main circuit, thereby prohibiting the driver from charging the battery.

Specifically, the first control unit 220 is further configured to, under the condition that the difference between the first voltage and the second voltage is less than or equal to the preset voltage, perform the following operations: controlling each first switch module to cut off the corresponding current capture circuit; and control the second switch module 8 to unidirectionally cut off the main circuit to only allow the battery 30 to supply electricity to the driver 20.

It should be noted that the power of the heating module needs to not only satisfy the requirement of the braking distance, but also ensure that the regenerated electromotive force is less than a protection voltage of the driver, which can be determined according to existing algorithms.

Under the condition that the second switch module 8 fails, an aerial equipment under normal working conditions cannot be moved to an emergency maintenance station and repaired by relevant maintenance personnel since the battery 30 cannot supply electricity to the aerial equipment.

In the embodiment of the present invention, a bypass switch 230 connected in parallel with the second switch module 8 may be further provided, and supplying electricity to the driver 20 from the battery 30 may be maintained by closing the bypass switch 230. Specifically, the feedback current control device 800 may further include: a bypass switch 230 that is connected in parallel with the second switch module 8. Correspondingly, the control module 200 may further include: a third control unit 222, configured to control the bypass switch 230 to be closed such that the battery 30 supplies electricity to the driver 20 under the condition that the second switch module 8 fails.

Of course, the control units (for example, the first control unit, the second control unit and the third control unit) in the above embodiments may be independent control units (for example, three independent controllers), or may be integrated in a same control unit (for example, a same controller).

The feedback current control device may further include: a first voltage sensor (not shown), configured to acquire the first voltage at one end of the driver 20 on the main circuit; and a second voltage sensor (not shown), configured to acquire the second voltage at one end of the battery 30 on the main circuit. The first voltage sensor (not shown) and the second voltage sensor (not shown) may be voltmeters.

Figure 9:
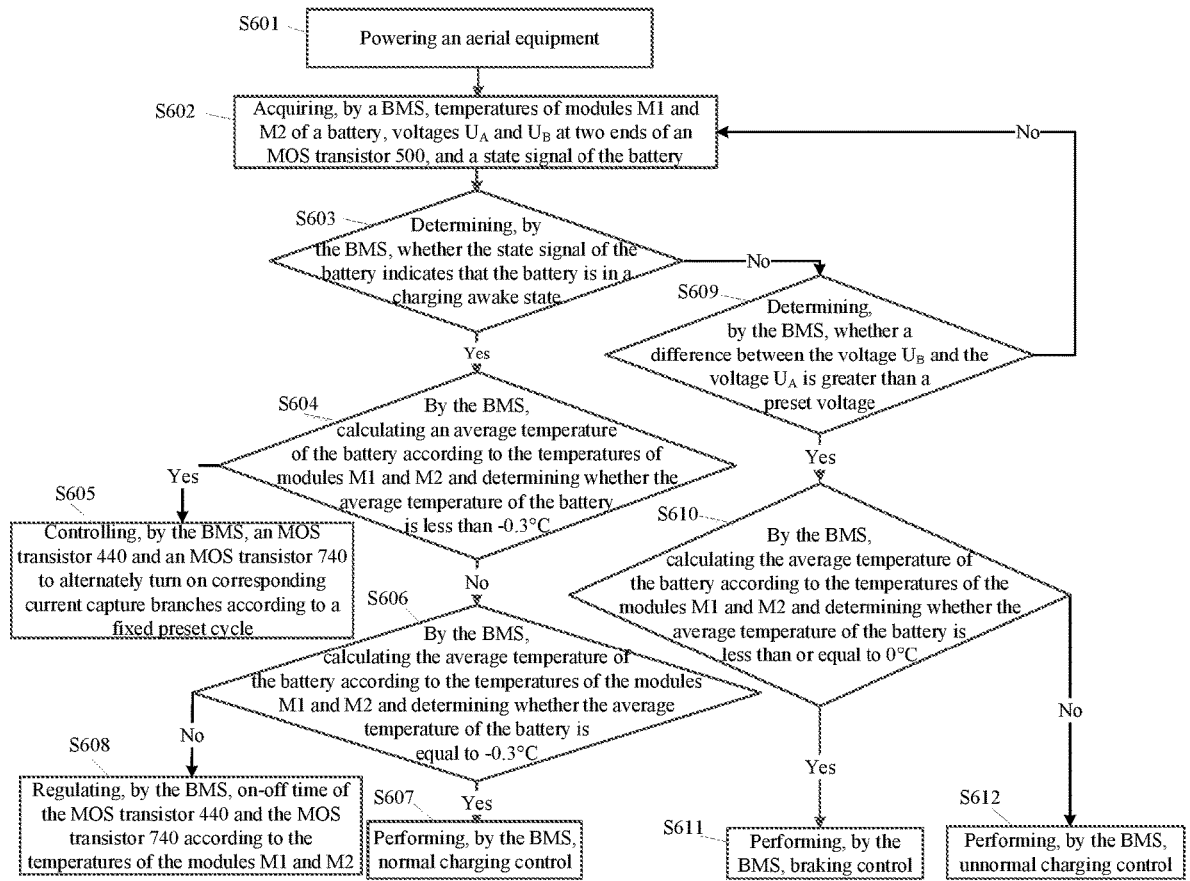
FIG. 9 is a flow chart of a charging control process for a battery according to an embodiment of the present invention.

Specifically, the charging control process for the battery will be explained and described below by taking the lithium-ion battery system shown in FIG. 4 as an example, as shown in FIG. 9. The heating films 420 and 421 are respectively arranged in cooperation with the positions of the modules M1 and M2.

As shown in FIG. 9, the charging control process for the battery may include steps S601-S612 as follows.

In step S601, powering an aerial equipment.

In step S602, acquiring, by a BMS, temperatures of modules M1 and M2 of a battery, voltages $U_A$ and $U_B$ at two ends of an MOS transistor 500, and a state signal of the battery.

The voltage ($U_A$) at a front end of the MOS transistor 500 and the voltage ($U_B$) at a rear end of the MOS transistor 500 are acquired by the BMS through an A/D converter. Other data may be directly acquired by the BMS.

In step S603, determining, by the BMS, whether the state signal of the battery indicates that the battery is in a charging awake state, if so, step S604 is performed, otherwise, step S609 is performed.

In step S604, by the BMS, calculating an average temperature of the battery according to the temperatures of modules M1 and M2 and determining whether the average temperature of the battery is less than −0.3° C., if so, step S605 is performed, otherwise, step S606 is performed.

In the embodiment, a preset temperature may be set to be 0° C., and a preset temperature difference may be set to be 0.3° C.

In step S605, controlling, by the BMS, an MOS transistor 440 and an MOS transistor 740 to alternately turn on corresponding current capture branches according to a fixed preset cycle.

By means of step S605, the purpose of time-sharing control on the heating of the two heating films may be achieved, so that the modules M1 and M2 can be heated uniformly with a smaller heating power.

In step S606, by the BMS, calculating the average temperature of the battery according to the temperatures of the modules M1 and M2 and determining whether the average temperature of the battery is equal to −0.3° C., if so, step S607 is performed, otherwise, step S608 is performed.

In step S607, performing, by the BMS, normal charging control.

Normal charging control: the BMS controls a contactor 54 to (bidirectionally) turn on the main circuit, controls the MOS transistor 440 to turn off the current capture branch where the MOS transistor 440 is located, and controls the MOS transistor 740 to turn off the current capture branch where the MOS transistor 740 is located (i.e., turn off the whole current capture circuit), such that the driver 20 charges the battery 30, which is similar to the conventional charging method in the prior art.

In S608, regulating, by the BMS, on-off time of the MOS transistor 440 and the MOS transistor 740 according to the temperatures of the modules M1 and M2.

By means of step S608, different modules are heated additionally, so that the purpose of uniformly heating the modules can be achieved.

In step S609, determining, by the BMS, whether a difference between the voltage Us and the voltage $U_A$ is greater than a preset voltage, if so, step S610 is performed, otherwise, step S602 is performed again.

If the difference between the voltage $U_B$ and the voltage $U_A$ is greater than the preset voltage (for example, 0 V), it indicates that the electric motor generates a heavy feedback current, and then step S610 needs to be further performed to determine, according to the temperature of the battery, whether unnormal charging can be performed on the battery, otherwise, it indicates that the electric motor does not generate a heavy feedback current, and step S602 is performed again.

In step S610, by the BMS, calculating the average temperature of the battery according to the temperatures of the modules M1 and M2 and determining whether the average temperature of the battery is less than or equal to 0° C., if so, step S611 is performed, otherwise, step S612 is performed.

If the difference between the voltage $U_B$ and the voltage $U_A$ is greater than the preset voltage (for example, 0 V) and the temperature of the battery is less than or equal to the preset temperature (for example, 0° C.), it indicates that charging the battery at the moment may pose a risk of lithium precipitation. At the moment, step S611 is performed to perform braking control. That is, the heavy feedback current is diverted to the current capture circuit, and the feedback current is consumed, for example, through the heating film 420 and the heating film 421, that is, unnormal charging is not performed on the battery 30.

If the difference between the voltage $U_B$ and the voltage $U_A$ is greater than the preset voltage (for example, 0 V) and the temperature of the battery is greater than the preset temperature (for example, 0° C.), it indicates that charging the battery at the moment may not pose a risk of lithium precipitation. At the moment, step S612 is performed to perform unnormal charging control. That is, the battery is charged with limited charging power.

In step S611, performing, by the BMS, braking control.

When the difference between the voltage $U_B$ and the voltage $U_A$ is greater than the preset voltage (for example, 0 V) and the temperature of the battery is less than or equal to the preset temperature (for example, 0° C.), braking control is enabled.

Braking control: the BMS turns off a contactor 54 so as to unidirectionally cut off the circuit for the driver 20 to charge the battery 30, and controls the MOS transistor 440 to turn on the current capture circuit where the MOS transistor 440 is located and controls the MOS transistor 740 to turn on the current capture circuit where the MOS transistor 740 is located (that is, to turn on a braking loop). At the moment, all the feedback currents are consumed by the heating film 420 and the heating film 421, thereby avoiding charging the battery. The purpose of braking control is to avoid the risk of lithium precipitation of the battery caused by the pulse feedback current when the battery is at low temperature. Meanwhile, the thermal energy converted by the heating film 420 and the heating film 421 can heat the corresponding modules M1 and M2.

The BMS has a fast charge heating function. However, the charge heating power of the traditional lithium-ion battery is usually low, so a longer charge heating time is required. Taking a 48V 315AH lithium-ion battery as an example, the power of a heating plate is about 300 W, and the heating rate is 10° C./h. After a lithium-ion battery with the same specifications is configured with the feedback current control function, the heating power is not less than 5 KW, and the charge heating rate can be increased to 1° C./min.

In step S612, performing, by the BMS, unnormal charging control.

When the difference between the voltage $U_B$ and the voltage $U_A$ is greater than the preset voltage (for example, 0 V) and the temperature of the battery is greater than the preset temperature (for example, 0° C.), unnormal charging control is enabled.

Unnormal charging control: the BMS controls the contactor 54 to (bidirectionally) turn on the main circuit, controls the MOS transistor 440 to turn on the current capture circuit where the MOS transistor 440 is located and controls the MOS transistor 740 to turn on the current capture circuit where the MOS transistor 740 is located, and meanwhile, and respectively controls on-off time of the MOS transistor 440 and the MOS transistor 740 by controlling a PWM duty cycle by using a PI control algorithm according to the difference between $U_B$ and $U_A$, thereby regulating the voltage division of the feedback current in the current capture circuit, i.e., realizing precise control on a braking voltage, and finally ensuring that the voltage $U_B$ in the main circuit is greater than $U_A$. The purpose of the charging control is to avoid "electricity stealing".

Compared with a solution of capturing the feedback current with the braking resistor, the embodiment has the features that the energy of the feedback current can be converted by the heating films into thermal energy which is used to heat the corresponding modules, which makes the energy utilization higher and is conducive to prolonging the battery life. Meanwhile, capacity fading of the lithium-ion battery at low temperature is reduced, and the adaptability of equipment in low temperature conditions is enhanced.

In conclusion, in an inventive way, the first switch module is controlled to turn on the current capture circuit when the difference between the first voltage at one end of the driver and the second voltage at one end of the battery on the main circuit is greater than the preset voltage and the average temperature of the battery is less than the preset temperature (for example, 0° C.). Then, the heating modules can convert the feedback current into the thermal energy, and the battery can be heated by the thermal energy. Thereby, when charging is performed at low temperature, the first heating module can capture all the feedback currents, and the battery can be heated by the thermal energy generated by the feedback currents, so that the requirements of equipment for braking can be met, also, the risk of lithium precipitation of the battery caused by the pulse feedback current when charging is performed at low temperature can be effectively avoided, thereby greatly reducing the probability of lithium precipitation of the battery and the risk of thermal runaway of the battery and enhancing the safety of the battery.

An embodiment of the present invention further provides an aerial equipment, including: the lithium-ion battery system.

For specific details and benefits of the aerial equipment in the embodiment of the present invention, reference can be made to the above description for the lithium-ion battery system, which will not be repeated here.

The preferred embodiments of the present invention have been described in detail above in conjunction with the accompanying drawings, but the present invention is not limited to the specific details in the above embodiments, and various simple variations may be made to the technical solutions of the present invention within the scope of the technical idea of the present invention. These simple variations are all within the protection scope of the present invention.

It should be further noted that the specific technical features described in the above specific embodiments may be combined in any suitable manner in the case of no contradiction. In order to avoid unnecessary repetition, various possible combinations of the present invention will not be further described.

In addition, any combination of the various embodiments of the present invention can be made as long as it does not deviate from the idea of the present invention, and should also be regarded as the contents disclosed by the present invention.

The invention claimed is:

1. A lithium-ion battery system, comprising:
   a battery, wherein a power circuit between the battery and a driver comprises: a main circuit between the battery and the driver; and a first current capture circuit configured to divide a feedback current delivered by the driver; and
   a feedback current control device, the feedback current control device comprises:

a first current capture device, located on the first current capture circuit and comprising:
a first feedback current capture module, configured to capture the feedback current, and
a first switch module, located on the main circuit, and configured to turn on the main circuit, or unidirectionally cut off the main circuit to only allow the battery to supply electricity to the driver; and
a control module, wherein the control module comprises:
a receiving unit, configured to receive a first voltage at one end of the driver and a second voltage at one end of the battery on the main circuit and a temperature of the battery, and
a first control unit, configured to, according to a difference between the first voltage and the second voltage and the temperature of the battery, perform the following operations: controlling the first switch module to unidirectionally cut off the main circuit under the condition that the difference between the first voltage and the second voltage is greater than a preset voltage and the temperature of the battery is less than or equal to a preset temperature, such that the first feedback current capture module on the first current capture circuit captures the feedback current.

2. The lithium-ion battery system according to claim 1, wherein the first switch module is a combination of a diode and a contactor connected in parallel, and
the first control unit configured to control the first switch module to unidirectionally cut off the main circuit comprises: controlling the contactor to be off so as to unidirectionally cut off the main circuit by the diode.

3. The lithium-ion battery system according to claim 1, wherein the first switch module is a first field-effect transistor with a chip, and
the first control unit configured to control the first switch module to unidirectionally cut off the main circuit comprises: controlling the chip of the first field-effect transistor to unidirectionally cut off the main circuit.

4. The lithium-ion battery system according to claim 1, wherein the first current capture device further comprises:
a second switch module, configured to turn on or off the first current capture circuit, and
the control module further comprises:
a second control unit, configured to, under the condition that the difference between the first voltage and the second voltage is greater than the preset voltage and the temperature of the battery is greater than the preset temperature, perform the following operations:
controlling the second switch module to turn on the first current capture circuit; and
controlling the first switch module to turn on the main circuit such that the driver charges the battery.

5. The lithium-ion battery system according to claim 4, wherein the second control unit is further configured to regulate on-off time of the second switch module according to the difference between the first voltage and the second voltage to ensure that the driver charges the battery.

6. The lithium-ion battery system according to claim 4, wherein the second control unit is further configured to, under the condition that the difference between the first voltage and the second voltage is less than or equal to the preset voltage, perform the following operations:
controlling the second switch module to cut off the first current capture circuit; and
controlling the first switch module to unidirectionally cut off the main circuit to only allow the battery to supply electricity to the driver.

7. The lithium-ion battery system according to claim 4, wherein the feedback current control device further comprises:
a second current capture device, located on a second current capture circuit connected in parallel with the first current capture circuit, wherein the second current capture device comprises:
a second feedback current capture module, configured to capture the feedback current; and
a third switch module, configured to turn on or off the second current capture circuit,
the second control unit is further configured to, under the condition that the difference between the first voltage and the second voltage is greater than the preset voltage and the temperature of the battery is less than or equal to the preset temperature, control the second switch module and the third switch module to turn on the first current capture circuit and the second current capture circuit such that the first feedback current capture module and the second feedback current capture module jointly capture the feedback current.

8. The lithium-ion battery system according to claim 7, wherein the first feedback current capture module or the second feedback current capture module is one of an energy consumption module, an energy storage module and a heating module.

9. The lithium-ion battery system according to claim 1, wherein the feedback current control device further comprises:
a bypass switch, wherein the bypass switch is connected in parallel with the first switch module, and
the control module further comprises: a third control unit, configured to control the bypass switch to be closed such that the battery supplies electricity to the driver under the condition that the first switch module fails.

10. A lithium-ion battery system, comprising:
a battery, the battery comprises a plurality of modules, and a power circuit between the battery and a driver comprises: a main circuit between the battery and the driver, and a current capture circuit configured to divide a feedback current delivered by the driver, wherein the current capture circuit comprises a plurality of current capture branches connected in parallel with each other; and
a feedback current control device, wherein the feedback current control device comprises:
a plurality of current capture module groups, located on the plurality of current capture branches and being in one-to-one correspondence with the plurality of current capture branches, and each of the plurality of current capture module groups comprising:
a heating module, arranged in cooperation with a position of a corresponding module of the battery, and configured to capture the feedback current and convert the feedback current into thermal energy so as to heat the module corresponding to the heating module, and
a first switch module, configured to turn on or off a current capture branch where the first switch module is located; and
a control module, comprising:
a first receiving unit, configured to receive a first voltage at one end of the driver and a second voltage at one end of the battery on the main circuit and an average temperature of the battery, and
a first control unit, configured to, according to a difference between the first voltage and the second voltage and the average temperature of the battery, perform the following the operations: controlling the first switch module in each of the current capture module groups to turn on the current capture branch where the first switch module is located under the condition that the difference between the first voltage and the second voltage is greater than a preset voltage and the average temperature of the battery is less than or equal to a preset temperature, such that the feedback current is converted into thermal energy by the heating module in each of the current capture module groups and the module corresponding to the heating module is heated by the converted thermal energy.

11. The lithium-ion battery system according to claim 10, wherein a power of the heating module is greater than a preset power.

12. The lithium-ion battery system according to claim 11, wherein the heating module is a heating film or a heat exchanger.

13. The lithium-ion battery system according to claim 11, wherein the heating module is arranged at a periphery of the module of the battery corresponding to the heating module.

14. The lithium-ion battery system according to claim 10, wherein the heating module is further configured to capture a charging current provided by the driver and convert the charging current into thermal energy so as to heat the module corresponding to the heating module, and
the control module further comprises:
a second receiving unit, configured to receive an electric quantity of the battery, and
a second control unit, configured to control the first switch module in each of the current capture module groups to turn on a corresponding current capture branch by a time-sharing control strategy under the condition that the battery is in a charging awake state and a difference between the preset temperature and the average temperature of the battery is greater than a preset temperature difference, such that the charging current provided by the driver is converted into thermal energy by the heating module on the corresponding current capture branch and the module corresponding to the heating module is heated by the converted thermal energy.

15. The lithium-ion battery system according to claim 14, wherein the time-sharing control strategy is to determine, according to the power of the heating module in each of the current capture module groups, a preset cycle during which the first switch module in each of the current capture module groups is controlled to turn on the corresponding current capture branch.

16. The lithium-ion battery system according to claim 14, wherein each of the current capture module groups further comprises: a temperature sensor, configured to acquire a temperature of the module corresponding to the heating module, and the second control unit is further configured to, under the condition that the electric quantity of the battery is less than a preset electric quantity and the difference between the preset temperature and the average temperature of the battery is greater than 0 and less than or equal to the preset temperature difference, control on-off time of respective first switch modules in the plurality of current capture module groups according to the temperatures of the modules of the battery, such that the battery is uniformly heated by the heating modules in the plurality of current capture module groups.

17. The lithium-ion battery system according to claim 10, wherein the feedback current control device further comprises: a second switch module, located on the main circuit, and configured to turn on the main circuit, or unidirectionally cut off the main circuit to only allow the battery to supply electricity to the driver, and
the first control unit is further configured to, under the condition that the difference between the first voltage and the second voltage is greater than the preset voltage and the average temperature of the battery is greater than the preset temperature, perform the following operations:
controlling the second switch module to turn on the main circuit; and
controlling the first switch module in each of the current capture module groups to turn on a corresponding current capture branch, and regulate the on-off time of the first switch module in each of the current capture module groups according to the difference between the first voltage and the second voltage to ensure that the driver charges the battery with the feedback current.

18. The lithium-ion battery system according to claim 17, wherein the second switch module is a combination of a diode and a contactor connected in parallel, and
the first control unit is further configured to control the contactor to be closed so as to turn on the main circuit, or control the contactor to be closed so as to unidirectionally cut off the main circuit by the diode; or
wherein the second switch module is a first field-effect transistor with a chip, and
the first control unit is further configured to control the chip of the first field-effect transistor to turn on the main circuit or unidirectionally cut off the main circuit.

19. The lithium-ion battery system according to claim 10, wherein each of the plurality of modules comprises at least one cell,
wherein a gap between the at least one cell is greater than a preset gap.

20. An aerial equipment, comprising: the lithium-ion battery system according to claim 1.

* * * * *